(12) United States Patent
Kimura et al.

(10) Patent No.: US 9,835,896 B2
(45) Date of Patent: Dec. 5, 2017

(54) LIQUID CRYSTAL DISPLAY DEVICE AND COLOR FILTER SUBSTRATE

(71) Applicant: Toppan Printing Co., Ltd., Taito-ku (JP)

(72) Inventors: Yukihiro Kimura, Taito-ku (JP); Kenzo Fukuyoshi, Taito-ku (JP)

(73) Assignee: Toppan Printing Co., Ltd., Taito-ku (JP)

( * ) Notice: Subject to any disclaimer, the term of this patent is extended or adjusted under 35 U.S.C. 154(b) by 0 days.

(21) Appl. No.: 14/815,194

(22) Filed: Jul. 31, 2015

(65) Prior Publication Data
US 2015/0338700 A1    Nov. 26, 2015

Related U.S. Application Data

(63) Continuation of application No. PCT/JP2013/057556, filed on Mar. 15, 2013.

(30) Foreign Application Priority Data

Jan. 31, 2013    (JP) .................................. 2013-017599

(51) Int. Cl.
*G02F 1/1335*    (2006.01)
*G02F 1/1333*    (2006.01)
(Continued)

(52) U.S. Cl.
CPC ....... *G02F 1/133514* (2013.01); *G02B 5/201* (2013.01); *G02B 5/223* (2013.01);
(Continued)

(58) Field of Classification Search
CPC ........ G06F 3/044; G06F 3/0412; G06F 3/041; G06F 2203/04111; G06F 2203/04103;
(Continued)

(56) References Cited

U.S. PATENT DOCUMENTS 5,844,645 A * 12/1998 Kashimoto ....... G02F 1/133512
349/106
6,525,791 B1 * 2/2003 Tsuda ................ G02F 1/133512
349/106
(Continued)

FOREIGN PATENT DOCUMENTS

JP          5-324203 A      12/1993
JP       2004-021545 A       1/2004
(Continued)

OTHER PUBLICATIONS

U.S. Appl. No. 14/754,099, filed Jun. 29, 2015, Kimura, et al.
(Continued)

*Primary Examiner* — Thoi Duong
(74) *Attorney, Agent, or Firm* — Oblon, McClelland, Maier & Neustadt, L.L.P.

(57) ABSTRACT

A liquid crystal display device having a touch panel function includes an array substrate, a liquid crystal layer including a liquid crystal molecule, and a color filter substrate positioned over the array substrate via the liquid crystal layer. The color filter substrate includes a transparent substrate, first and second transparent electrode layers, a color filter formed on the first transparent electrode layer and including a red filter, a green filter and a blue filter, and a transparent resin layer formed on the color filter. The color filter and the transparent resin layer have a total thickness in a range of approximately from 2.5 μm to 9 μm. The liquid crystal molecule has negative dielectric anisotropy and an initial state alignment which is parallel to a substrate surface. The liquid crystal molecule rotates within a plane parallel to the substrate surface when a liquid crystal drive voltage is applied.

20 Claims, 14 Drawing Sheets

(51) Int. Cl.
*G02F 1/1343* (2006.01)
*G02F 1/137* (2006.01)
*G02B 5/20* (2006.01)
*G02B 5/22* (2006.01)
*G06F 3/041* (2006.01)
*G06F 3/044* (2006.01)

(52) U.S. Cl.
CPC .......... *G02F 1/137* (2013.01); *G02F 1/13338* (2013.01); *G02F 1/13439* (2013.01); *G02F 1/133512* (2013.01); *G02F 1/134309* (2013.01); *G06F 3/044* (2013.01); *G06F 3/0412* (2013.01); *G02F 2001/13712* (2013.01); *G06F 2203/04103* (2013.01)

(58) Field of Classification Search
CPC . G06F 2203/04112; G06F 2203/04107; G06F 1/16; G02F 1/13338; G02F 1/134363; G02F 1/136286; G02F 1/1333; G02F 1/133512; G02F 1/1343; G02F 1/134336; G02F 1/1335; G02F 1/133514; G02F 1/133528; G02F 1/133345; G02F 1/134309; G02F 1/136; G02F 1/1362; G02F 2001/134318; G02F 2001/134372; G02F 2201/12; G09G 3/3648; G09G 3/36; G09G 2300/0426; C09K 19/02
USPC ........ 345/173, 87, 92; 349/12, 139, 141, 96, 349/110, 187, 42, 138, 106, 178
See application file for complete search history.

(56) References Cited

U.S. PATENT DOCUMENTS

| | | | |
|---|---|---|---|
| 7,791,689 B2 * | 9/2010 | Wang | G02F 1/133514 345/88 |
| 2006/0229376 A1 | 10/2006 | Hayashi et al. | |
| 2009/0046077 A1 | 2/2009 | Tanaka et al. | |
| 2010/0233387 A1 * | 9/2010 | Chen | C08L 63/10 428/1.31 |
| 2010/0321327 A1 * | 12/2010 | Liu | G02F 1/13338 345/174 |
| 2011/0216043 A1 | 9/2011 | Tamura et al. | |

FOREIGN PATENT DOCUMENTS

| | | |
|---|---|---|
| JP | 2006-343921 A | 12/2006 |
| JP | 2008-185785 A | 8/2008 |
| JP | 2010-160745 A | 7/2010 |
| JP | 2011-210242 A | 10/2011 |
| JP | 2012-003082 A | 1/2012 |
| JP | 2012-93649 A | 5/2012 |
| JP | 2012-215765 A | 11/2012 |
| WO | WO 2007/102238 A | 9/2007 |

OTHER PUBLICATIONS

U.S. Appl. No. 14/753,577, filed Jun. 29, 2015, Kimura, et al.
International Search Report dated Jun. 11, 2013 in PCT/JP2013/057556, filed Mar. 15, 2013.
Extended European Search Report dated Aug. 10, 2016 in Patent Application No. 13873478.5.

* cited by examiner

LONGITUDINAL DIRECTION

HORIZONTAL DIRECTION

LIQUID CRYSTAL DISPLAY DEVICE AND COLOR FILTER SUBSTRATE

CROSS-REFERENCE TO RELATED APPLICATIONS

The present application is a continuation of International Application No. PCT/JP2013/057556, filed Mar. 15, 2013, which is based upon and claims the benefits of priority to Japanese Application No. 2013-017599, filed Jan. 31, 2013. The entire contents of these applications are incorporated herein by reference.

BACKGROUND OF THE INVENTION

Field of the Invention

The present invention relates to a liquid crystal display device having a touch sensing function and a color filter used for the same.

Discussion of the Background

In a touch sensing operation in which a location of a pointer or an operation is detected, on-cell type touch panels have been widely used for liquid crystal display devices. On-cell type touch panels are provided on each liquid crystal cells. Types of touch panel include an electrostatic capacitance type, resistive film type, optical type, electromagnetic induction type or the like. In recent years, electrostatic capacitance type has been widely used because of the ease of handling. For example, patent literature 1 (Japanese Patent Application Laid-Open Publication Number 1993-324203) discloses an electrostatic capacitance type touch panel.

In a case where an on-cell type touch panel is provided in portable equipment or the like, thickness and weight of the portable equipment increases. Hence, provision of on-cell type touch panels is sometimes avoided in portable equipment.

A technique for forming a transparent conductive film on the front surface of a transparent glass substrate and forming a shield electrode on the back surface of the substrate is disclosed, for example, by patent literature 1 (Japanese Patent Application Laid-Open Publication Number 1993-324203). As a similar technique, patent literature 2 (Japanese Patent Application Laid-Open Publication Number 2008-185785) discloses a technique that detects electrostatic capacitance by using a dielectric such as a polarizing plate formed on a detection electrode which is formed on the front surface (outer surface) of the second substrate which is provided with a color filter. In patent literature 2, a shield conductor is further provided on a side that comes into contact with the liquid crystal layer. However, the patent literatures 1 and 2 do not disclose a position detecting technique in which a transparent electrode pattern of X-direction and a transparent electrode pattern in the Y-direction are formed on a transparent substrate such as a glass substrate and high-precision touch sensing by a pointer is accomplished. Further, patent literatures 1 and 2 disclose a configuration having a shield electrode to detect a capacitive component.

Patent literature 3 (international publication number WO 2007/102238) discloses a configuration in which a shield electrode is provided and electrodes related to a touch sensing are disposed in the liquid crystal cell. However, patent literature 3 does not disclose a technique that enhances detection accuracy of electro capacitive type touch sensing.

Patent literature 4 (Japanese Patent Application Laid-Open Publication Number 2010-160745) discloses a color filter using a conductive light shielding portion, capable of being disposed in a liquid crystal cell and of being applied to electrostatic capacitive type touch sensing. However, patent literature 4 does not disclose a technique that enhances detection accuracy of electro capacitive type touch sensing.

Patent literature 5 (Japanese Patent Application Laid-Open Publication Number 2012-93649) discloses a color filter substrate used for a fringe field switching mode liquid crystal display device. According to the color filter of the patent literature 5, red pixels, green pixels and blue pixels are separated by a black matrix. In the embodiment of the patent literature 5, the black matrix is formed by using a black coloring composition with a thickness of 2 μm. A configuration in which colored pixels are formed on a black material having a large film thickness is not supposed to be used for high precision pixels for portable display device having, for example, 400 ppi (pixels per inch). In a case where a protrusion of the colored layer which is formed when the colored layer is coated on the black matrix having a thickness of 2 μm and a variation of a film thickness of the colored pixels become large, liquid crystal alignment fluctuates so that it is hard to perform liquid crystal display in an uniform manner. Moreover, in patent literature 5, no touch sensing technique is disclosed and influences on the liquid crystal molecules and the liquid crystal alignment caused by high electrostatic discharge propagated from the electrode that detects electrostatic capacitance during a touch operation are not considered.

According to paragraph [0105] and FIG. 34 of patent literature 6 (Japanese Patent Application Laid-Open Publication Number 2009-199093), a configuration is disclosed in which two ITO (indium-tin-oxide) layers related to touch sensing as a concept B are formed on both surfaces of the upper glass, and a color filter and Vcom (ITO3) on the color filter are provided.

SUMMARY OF THE INVENTION

According to one aspect of the present invention, a liquid crystal display device having a touch panel function includes an array substrate, a liquid crystal layer including a liquid crystal molecule, and a color filter substrate positioned over the array substrate via the liquid crystal layer. The color filter substrate includes a transparent substrate having a first surface and a second surface opposite to the first surface, a first transparent electrode layer formed on the first surface, a second transparent electrode layer formed on the second surface on a display surface side, a color filter formed on the first transparent electrode layer and including a red filter, a green filter and a blue filter, and a transparent resin layer formed on the color filter on a side of the liquid crystal layer. The color filter and the transparent resin layer have a total thickness in a range of approximately from 2.5 μm to 9 μm. The liquid crystal layer is formed such that the liquid crystal molecule has negative dielectric anisotropy and an initial state alignment which is parallel to a substrate surface, and that the liquid crystal molecule rotates within a plane parallel to the substrate surface when a liquid crystal drive voltage is applied.

According to another aspect of the present invention, a color filter substrate includes a transparent substrate having a first surface and a second surface opposite to the first surface, a first transparent electrode layer formed on the first surface, a second transparent electrode layer formed on the second surface on a display surface side, a color filter formed on the first transparent electrode layer and including a red filter, a green filter and a blue filter, and a transparent resin layer formed on the color filter on a side of the liquid crystal layer. The color filter and the transparent resin layer have a total thickness in a range of approximately from 2.5 µm to 9 µm. Each of the red, green and blue filters has a relative dielectric constant ranging from 2.9 to 4.4 when measured at a frequency for driving a liquid crystal display, and the relative dielectric constant of each of the red filter, the green filter and the blue filter is within ±0.3 of an average relative dielectric constant of the red, green and blue filters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
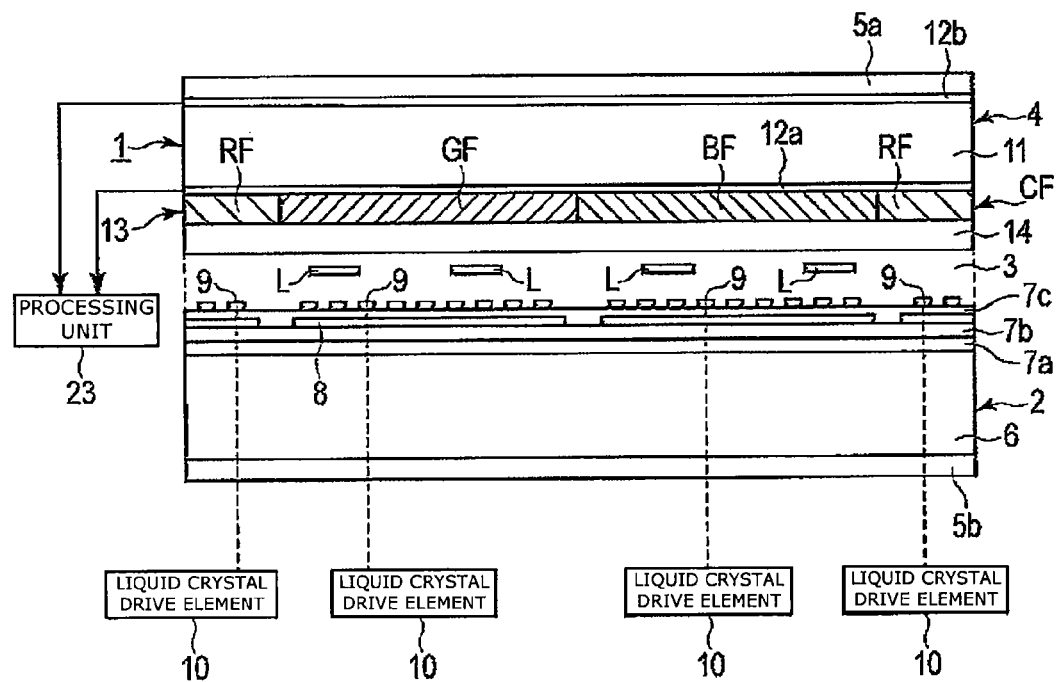
FIG. 1 is a cross sectional view showing an example of a liquid crystal panel provided in a liquid crystal display device according to the first embodiment.

With reference to the drawings, hereinafter will be described embodiments of the present invention. In the following explanations, regarding functions and elements which are identical or substantially identical, the same reference numbers are applied and the explanation is omitted or explained as necessary.

In the respective embodiments, only a portion having distinct features is described, and explanation for portions which are not different from a regular liquid crystal display device is omitted.

In the respective embodiments, a case is described where the unit of display in the liquid crystal display device is a single pixel (or picture element). However, the unit for display may be other units such as one sub pixel. It is assumed that the pixel is a polygon having at least two parallel sides.

In a plan view, a horizontal direction of the pixel is defined to be parallel to a direction along which the right eye and the left eye of the observer are located.

In a plan view, a direction perpendicular to the horizontal direction of the pixel is defined as the longitudinal direction of the pixel.

In the respective embodiments, the width of the pixel in the longitudinal direction is approximately the same as the width of the opening of the pixel in the longitudinal direction. The width of the pixel in the horizontal direction is approximately the same as the width of the opening in the horizontal direction.

In the respective embodiments, various liquid crystal drive methods may be used. For example, a liquid crystal alignment method or a liquid crystal drive method such as the IPS method (horizontal electric field method using liquid crystal molecules with horizontal alignment), VA (Vertically Alignment: vertical electric field method using liquid crystal molecules with vertical alignment), HAN (Hybrid-aligned Nematic), OCB (Optically Compensated Bend), or CPA (Continuous Pinwheel Alignment) may be used. It should be noted that a liquid crystal drive method of the IPS method may preferably be used in the respective embodiments. A liquid crystal layer may include liquid crystal molecules having a positive dielectric anisotropy or liquid crystal molecules having a negative dielectric anisotropy.

A rotational direction (operational direction) of the liquid crystal molecules when liquid crystal drive voltage is applied may be a direction parallel to the surface of the substrate. The rotational direction of the liquid crystal molecules when liquid crystal drive voltage is applied may be from a direction where the long axes of the liquid crystal molecules are along the horizontal direction with respect to the substrate surface to a direction where the liquid crystal molecules are along the vertical direction with respect to the substrate surface or may be from a direction where the liquid crystal molecules are along the vertical direction with respect to the substrate surface to a direction where the long axes of the liquid crystal molecules are along the horizontal direction with respect to the substrate surface. A direction along which the liquid crystal drive voltage is applied to the liquid crystal molecules may be a horizontal direction or a two or three dimensional oblique direction or a vertical direction.

First Embodiment

Figure 2:
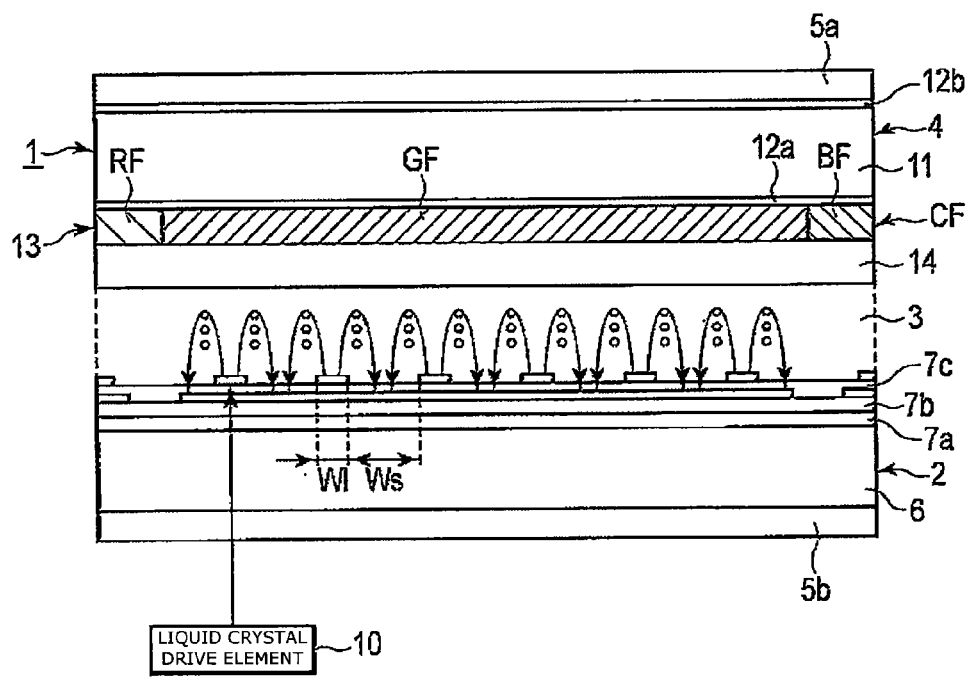
FIG. 2 is a cross sectional view showing an example of a liquid crystal panel according to the first embodiment when a liquid crystal drive voltage is applied.

FIG. 1 and FIG. 2 are cross sectional view showing an example of a liquid crystal display 1 provided in the liquid crystal display device according to the present embodiment. FIG. 1 exemplifies a cross section along the horizontal direction of a red pixel RP, a green pixel GP and a blue pixel BP. FIG. 2 exemplifies a cross section along the horizontal direction of the green pixel GP.

In FIG. 1 and FIG. 2, an upper side of the liquid crystal panel 1 (hereinafter may be referred to as a front side or display surface side) is an observer side and an lower side of the liquid crystal panel 1 (back side) is an internal side of the liquid crystal display device. The liquid crystal display device is provided with, in the lower side of the liquid crystal panel 1, an optical control element which is not shown and a backlight unit which is not shown.

The liquid crystal panel 1 is provided with an array substrate 2, liquid crystal layer 3 and a color filter substrate 4. The array substrate 2 and the color filter substrate 4 face each other via the liquid crystal layer 3.

In the boundary surface between the array substrate 2 and the liquid crystal layer 3, an alignment film which is not shown is formed.

In the upper side and the lower side of the liquid crystal panel 1, optical films 5a and 5b are provided. The optical films 5a and 5b include a polarizing plate and a phase difference plate or a polarizing plate. An optical axis (absorption axis of the polarizing plate) of the two optical films 5a and 5b is set to be in a crossed Nicols configuration. Hence, the liquid crystal display device is normally black.

The array substrate 2 is provided with a transparent substrate 6, insulation layers 7a to 7c, common electrodes 8, pixel electrodes 9 and a liquid crystal drive element 10. As a liquid crystal drive element 10, for example, a thin film transistor can be used.

As a transparent substrate 6, for example, a glass plate is employed.

The insulation layers 7a and 7b are formed on a first surface of the transparent substrate 6. The common electrodes 8 are formed on the insulation layer 7b. The insulation layer 7c is formed on the insulation layer 7b on which the common electrodes 8 are formed. The pixel electrodes 9 are formed on the insulation layer 7c. As the insulation layers 7a to 7c, for example, SiN, SiO2 or mixture of these are used. The pixel electrode 9 and the common electrodes 9 may include conductive metal oxide. As a metal oxide, a transparent conductive film such as ITO is used.

A pixel electrodes 9 side of the array substrate 2 is a liquid crystal layer 3 side. A second surface of the transparent substrate 6 of the array substrate 2 is an inner side of the liquid crystal display apparatus.

For example, the common electrodes 8, the pixel electrodes 9 and the liquid crystal drive element 10 are provided for every pixel. The common electrodes 8 and the pixel electrodes 9 may be formed, for example, into comb-shaped, band-shaped, line-shaped, plate-shaped or striped patterns. In FIG. 1 and FIG. 2, the common electrodes are in a plate-shaped pattern and the pixel electrodes are in a comb-shaped pattern. In FIG. 1, the cross section of the pixel electrodes 9 is defined as a cross section perpendicular to the longitudinal direction of the comb-shape.

The liquid crystal drive voltage is applied between the common electrodes 8 and the pixel electrodes 9 when the liquid crystal is driven and the liquid crystal drive voltage is not applied between the common electrodes 8 and the pixel electrodes 9 when the liquid crystal is not driven. The liquid crystal drive element 10 switches the liquid crystal drive voltage between the common electrodes 8 and the pixel electrodes to be applied or not applied.

In the respective pixel electrodes, the lateral width of the pixel electrode 9 is defined as Wl and the space width (gap) is defined as Ws.

The color filter substrate 4 is provided with a transparent substrate 11, transparent electrode layers 12a and 12b, a color filter layer 13 and a transparent resin layer 14. As a transparent substrate 11, for example, glass is used. The transparent electrode layer 12a is formed on a first surface of the transparent substrate 11 and the transparent electrode layer 12b is formed on a second surface of the transparent substrate 11.

The color filter layer 13 is formed on the transparent electrode layer 12a.

According to the present embodiment, the color filter layer 13 includes a color filter CF. However, the color filter layer 13 may further include, for example, a light shielding layer such as a black matrix. The color filter CF includes red filters RF, blue filters BF and green filters GF.

The transparent resin layer 14 is formed on the color filter layer 13.

A transparent resin layer 14 side of the color filter substrate 4 is a liquid crystal layer 3 side. A transparent electrode layer 12b side of the color filter substrate 4 is an observer side. A display surface is a surface which the observer views and is defined as a surface opposite to the transparent resin layer side 14. According to the present embodiment, the transparent electrode layer 12b for touch sensing is formed on a surface of the observer side of the transparent substrate 11 and a transparent electrode layer 12a is formed on a surface of the liquid crystal layer 3 side of the transparent substrate 11.

In the present embodiment, the liquid crystal layer 3 includes, for example, liquid crystal molecules L for an IPS method. The dielectric anisotropy is negative, but, however, may be positive.

As shown in FIG. 1, a longitudinal axis of the liquid crystal molecules L are approximately in a horizontal direction under a state in which voltage of the liquid crystal drive voltage is not applied, when viewing in a plan view. As shown in FIG. 2, a longitudinal axis of the liquid crystal molecules L are approximately in a longitudinal direction under a state in which a voltage of the liquid crystal drive voltage is applied, when viewing in a plan view. However, the longitudinal axis of the liquid crystal molecules may be approximately in the longitudinal direction under a state in which voltage of the liquid crystal drive voltage is not applied, when viewing in a plan view and may be approximately in the horizontal direction under a state in which a voltage of the liquid crystal drive voltage is applied, when viewing in a plan view.

When the pointer approaches the observer side of the liquid crystal display device, electrostatic capacitance between the transparent electrode layer 12a and the transparent electrode layer 12b is changed in an area proximate to the pointer. A processing unit 23 detects the change in the electrostatic capacitance between the transparent electrode layer 12a and the transparent electrode layer 12b, thereby detecting the position of the pointer or a movement of the pointer.

As shown in FIG. 2, electric line of force being extended from the pixel electrode 9 towards the common electrode 8 has occurred.

The horizontal direction corresponds to a direction along which a plurality of comb teeth of the pixel electrodes 9 are arranged or a direction perpendicular to the long axis direction of the comb teeth of the pixel electrodes 9.

According to the present embodiment, the liquid crystal molecules L rotate parallel with respect to the substrate surface of the color filter substrate 4.

Figure 3:
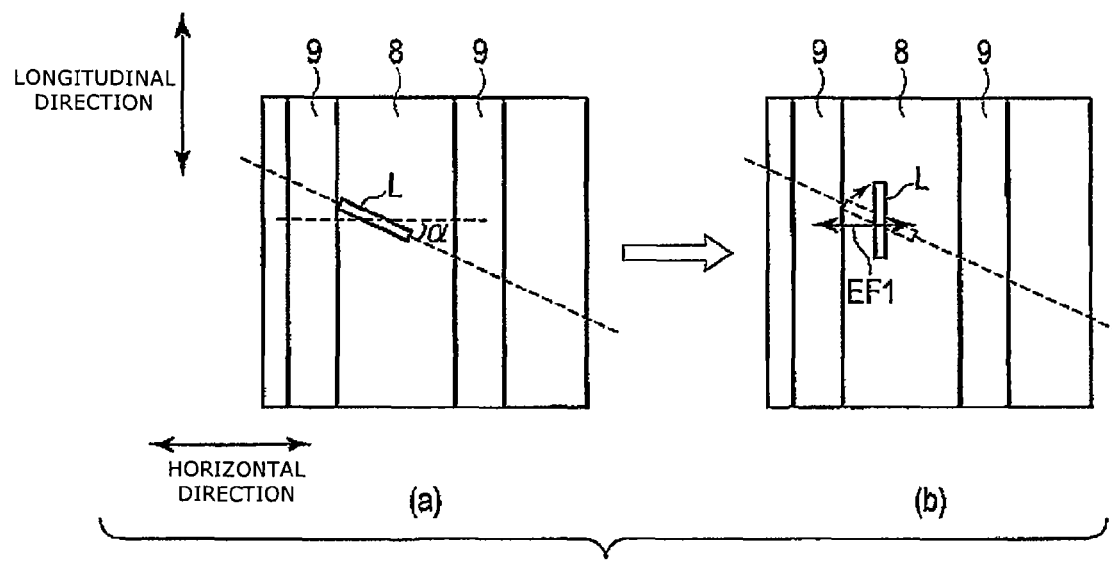
FIG. 3 is a plan view showing a rotational state of liquid crystal molecules.

FIG. 3 is a plan view that shows an example of a rotational state of the liquid crystal molecules L. FIG. 3 shows a state where the common electrodes 8 are arranged under the pixel electrodes 9, in plan view. FIG. 3 (a) shows a state where the liquid crystal drive voltage is not applied between the pixel electrodes 9 and the common electrodes 8. FIG. 3 (b) shows a state where the liquid crystal drive voltage is applied between the pixel electrodes 9 and the common electrodes 8.

The liquid crystal molecules L may have a horizontal alignment having rubbing angle (direction of alignment processing) a which is approximately 5 to 20 degrees. In FIG. 3, the liquid crystal molecules L have negative dielectric anisotropy. When the liquid crystal drive voltage is applied between the pixel electrodes 9 and the common electrode 8, for example, an electric field EF1 occurs. The liquid crystal molecules L rotate such that the longitudinal axes of the liquid crystal molecules L become perpendicular to the direction of the electric field EF1. The liquid crystal molecules L rotate so that a white display is produced in which light emitted from the back light unit is transmitted.

For example, in the liquid crystal molecules L having horizontal alignment in an initial state and using the IPS method, a change in electrical capacitance when viewing from a vertical direction of the substrate (thickness direction) is extremely small. When the liquid crystal molecules L rotate horizontally, a change in dielectric of the liquid crystal layer 3 in the thickness direction becomes small so that the accuracy of electrostatic capacitance type touch sensing is not deteriorated. Meanwhile, in a vertical electric field drive such as so-called VA or EVA, the behavior of the liquid crystal molecules L may cause a change in a dielectric constant in a thickness direction of the liquid crystal layer 3 (change in capacitance of the liquid crystal layer 3). Hence, to enhance the detection accuracy of the touch sensing, liquid crystal molecules L having horizontal alignment in an initial state and using the IPS method may preferably be used.

Figure 4:
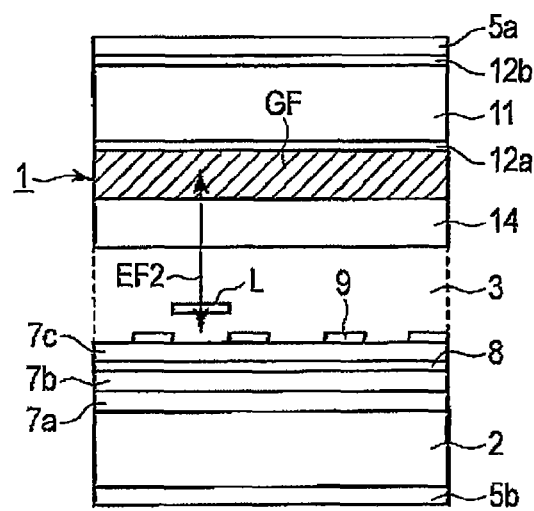
FIG. 4 is a cross sectional view showing an example of a state of liquid crystal molecules having negative dielectric anisotropy when electric field in a substrate vertical direction occurs.

FIG. 4 is a cross sectional view showing an example of a state of the liquid crystal molecules L having a negative dielectric anisotropy when an electric field EF2 in a vertical direction of the substrate occurs. FIG. 4 shows a cross sectional view taken along the horizontal direction.

When high voltage is applied by static electricity of the pointer such as a finger, for example, because of an influence of large electrostatic capacitance, an electric field EF2 is produced between the transparent electrode layer 12a and the liquid crystal layer 3. However, when the liquid crystal molecules L have negative dielectric anisotropy, the behavior of the liquid crystal molecules L seldom influences the electric field EF2 so that the quality of the liquid crystal display is not significantly influenced.

Figure 5:
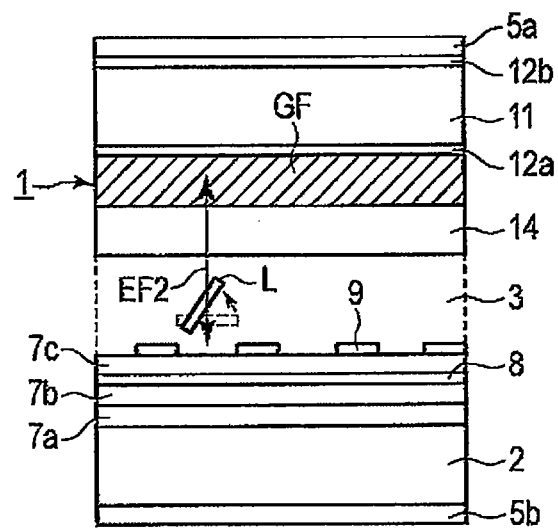
FIG. 5 is a cross sectional view showing an example of a state of liquid crystal molecules having positive dielectric anisotropy when an electric field in a substrate vertical direction occurs.

FIG. 5 is a cross sectional view showing an example of a state of the liquid crystal molecules L having a positive dielectric anisotropy when an electric field EF2 in a vertical direction of the substrate occurs. FIG. 5 shows a cross sectional view taken along the horizontal direction.

In FIG. 5, the liquid crystal molecules L have a positive dielectric anisotropy and an initial alignment is in a horizontal state with respect to the substrate surface. When a high voltage is applied by static electricity from the pointer, the electric field EF2 is produced and the liquid crystal molecules L rise along a direction of the electric field EF2. By this behavior, light leakage or unintentional coloring may happen.

Therefore, according to the present embodiment, the dielectric anisotropy of the liquid crystal molecules may preferably be negative.

Figure 6:
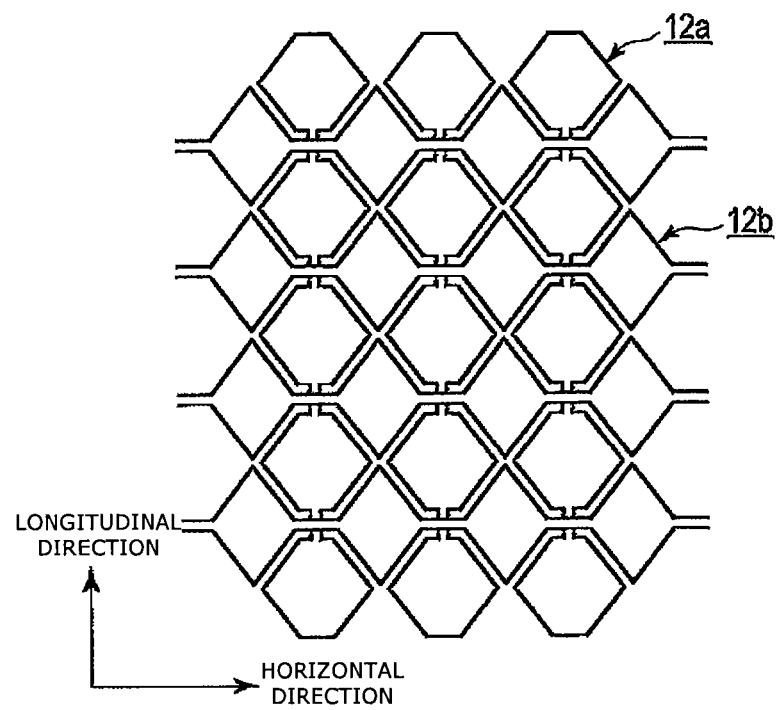
FIG. 6 is a plan view showing a first example of a transparent electrode layer according to the first embodiment.

FIG. 6 is a plan view showing a first example of the transparent electrode layer 12a and 12b according to the present embodiment. FIG. 6 shows a state where a transparent electrode layer 12a is disposed under the transparent electrode layer 12b when viewing from a plan view. That is, FIG. 6 and FIG. 7 shows a state where the transparent electrode layer 12b and the transparent electrode layer 12a are viewed from the observer side.

In FIG. 6, the transparent electrode layer 12b is a pattern in which a plurality of rhombuses is mutually connected in the horizontal direction. The transparent electrode layer 12a is a pattern in which a plurality of rhombuses is mutually connected in the longitudinal direction.

Figure 7:
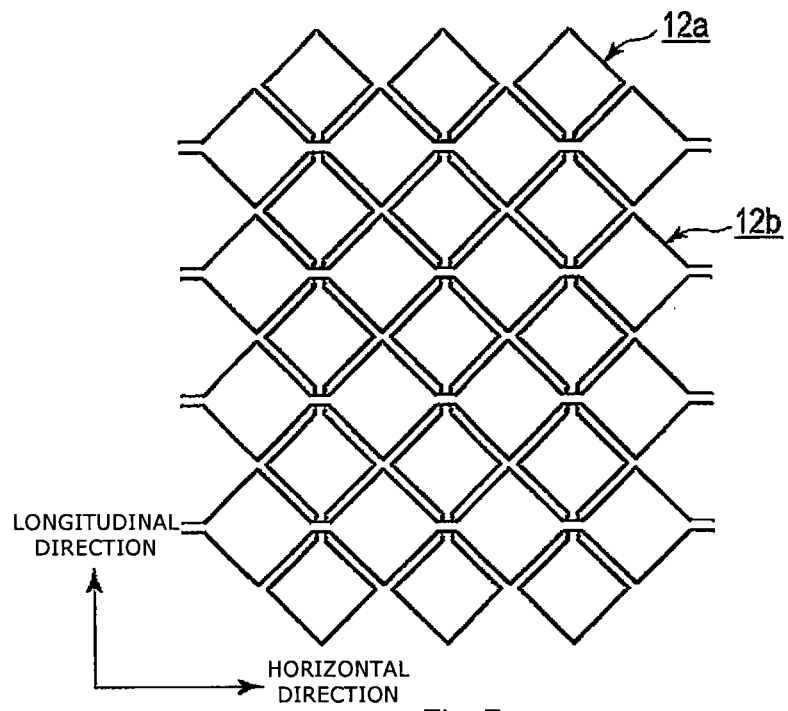
FIG. 7 is a plan view showing a second example of a transparent electrode layer according to the first embodiment.

FIG. 7 is a plan view showing a second example of the transparent electrode layers 12a and 12b.

In FIG. 7, the transparent electrode layer 12b is a pattern in which a plurality of quadrangles is mutually connected in the horizontal direction. The transparent electrode layer 12a is a pattern in which a plurality of quadrangles is mutually connected in the longitudinal direction.

The transparent electrode layer 12a and the transparent electrode layer 12b are orthogonally crossed with each other in a plan view. It is noted that the direction of connection can be flexibly changed.

In FIG. 6 and FIG. 7, the transparent electrode layers 12a and 12b are alternately arranged to have substantially no gaps therebetween in a plan view. An electrostatic capacitance between the transparent electrode layer 12a and the transparent electrode layer 12b located proximate to the pointer is detected, when the pointer approaches the observer side of the liquid crystal display device. Thus, the position of the pointer or the movement of the pointer can be identified. Antireflection coatings of which the index of refraction is equal to 1.6 or less can be laminated on the surface of the transparent electrode layer 12b and on the surface of the transparent electrode layer 12a.

Figure 8:
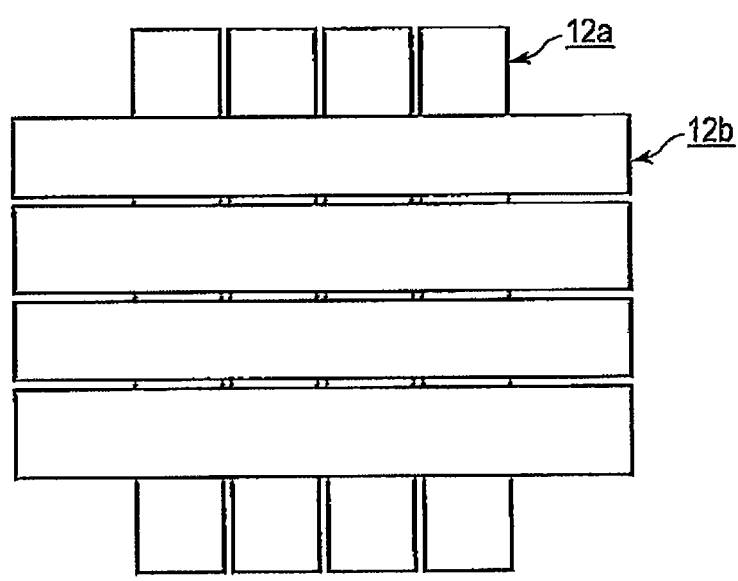
FIG. 8 is a plan view showing a third example of a transparent electrode layer according to the first embodiment.

FIG. 8 is a plan view showing a third example of the transparent electrode layers 12a and 12b according to the present embodiment. In FIG. 8, the transparent electrode layer 12b is a stripe pattern that extends in the horizontal direction. The transparent electrode layer 12a is a stripe pattern that extends in the longitudinal direction.

The transparent electrode layers 12a and 12b are overlapped without any gaps in a plan view.

In FIGS. 6 to 8, shapes and areas for the transparent electrode layer 12b and the transparent electrode layer 12a can be appropriately adjusted. A pattern size produced between the transparent electrode later 12b and the transparent electrode layer 12a can be adjusted in various ways based on a required resolution or a size and a pitch of a red filter RF, a green filter GF, and a blue filter BF of the color filter CF. As for the transparent electrode layer 12b and the transparent electrode layer 12b, a film of a transparent metal oxide such as ITO is formed on both sides of the transparent substrate 4 to form the pattern by a photolithography method, thereby producing the transparent electrode layers 12a and 12b.

In the liquid crystal display device according to the present embodiment, the transparent electrode layer 12a and the transparent electrode layer 12b which are detection electrodes of the touch sensing are disposed at a location proximately to the pointer. Therefore, a change in electrostatic capacitance caused by the pointer can be detected precisely.

According to the present embodiment, the position of the pointer can be accurately detected by the transparent electrode layer 12b connected in the horizontal direction and the transparent electrode layer 12a.

According to the present embodiment, a touch sensing function which is integrated to the color filter substrate 4 can be provided, in particular, on both sides of the transparent substrate 11. Hence, for example, like an on-cell type touch panel, extra thickness and weight can be avoided.

According to the present embodiment, the transparent electrode layer 12b and the transparent electrode layer 12a are disposed as a pattern without any gaps as much as possible. Thus, the liquid crystal display device can avoid being influenced by external electric fields from the display surface.

According to the present embodiment, liquid crystal molecules having negative dielectric anisotropy are used. For example, even when the liquid crystal display device suffers from high voltage static electricity propagated from the pointer, the liquid crystal molecules L are difficult to move and the quality of the liquid crystal display device can be avoid from degrading.

In the liquid crystal display device according to the present embodiment, a shield electrode dedicated for shielding may not be provided on a color filter substrate 4 side.

In the liquid crystal display device according to the present embodiment, since the transparent electrode layer 12b is provided at a position proximate to the pointer, the sensitivity (magnitude of electrostatic capacitance) of the transparent electrode layer 12b is better than an in-cell technique in which electrostatic capacitance elements are arranged. Accordingly, in the present embodiment, the position of the pointer or a movement of the pointer can be detected precisely.

Regarding a state where the transparent electrode layer 12a and the transparent electrode layer 12b are overlapped in a plan view, having substantially no gaps therebetween, gaps between respective electrode patterns may be approximately 10 μm or equal to or less than 5 μm. As long as the gaps are smaller than the pixel size, the influence of electric noise external to the screen of the liquid crystal display can be suppressed so that liquid crystal display can be performed with high image quality.

Figure 9:
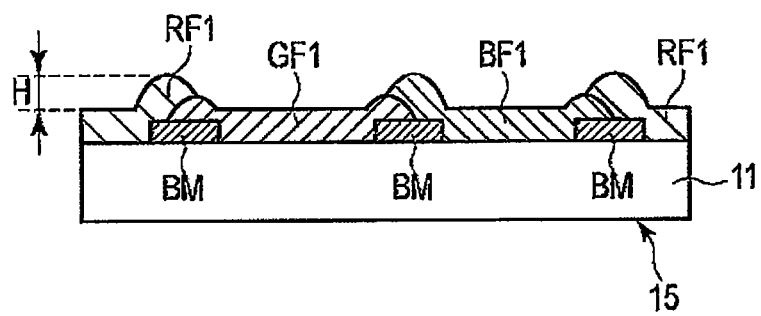
FIG. 9 is a cross sectional view showing an example of a conventional color filter substrate.

Hereinafter will be described differences between the color filter substrate 4 according to the present embodiment and a conventional color filter substrate 15. FIG. 9 is a cross sectional view showing an example of the conventional color filter substrate 15. The conventional color filter substrate 15 as shown in FIG. 9 is provided in a liquid crystal display device using an IPS or FFS (fringe field switching) method. The color filter 15 includes, as a light shielding layer to enhance the contrast of the liquid crystal, for example, a black matrix BM having film thickness approximately 2 μm and includes a red filter RF1, a green filter GF1 and a blue filter BF1 on the black matrix BM. In this configuration, a protrusion due to overlapped portions between color filters may be formed on the black matrix. The height of the protrusion may be approximately 1 μm or more. The height of the protrusion has a greater impact as the pixels are made finer. Accordingly, it is difficult to maintain uniform liquid crystal alignment on the surface of the color filter substrate 15.

In contrast, the color filter substrate 4 according to the present embodiment, the color filter CF and the black matrix BM do not overlap in the thickness direction in the effective display region so that protrusions are not formed. As a result, the surface of the color filter substrate 4 can be flat.

Figure 10:
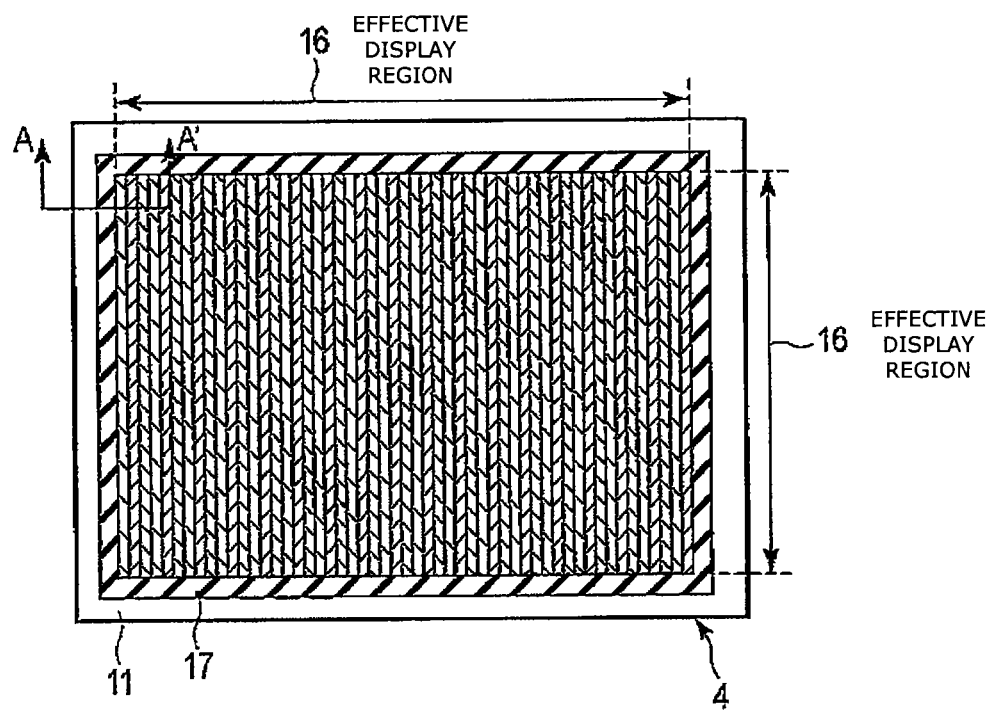
FIG. 10 is a plan view showing an example of a color filter substrate according to the first embodiment.

FIG. 10 is a plan view showing an example of the color filter substrate 4 according to the present embodiment.

In the present embodiment, a display screen includes an effective display region 16 and a frame region 17. The frame region 17 surrounds respective sides of the effective display region 16.

Figure 11:
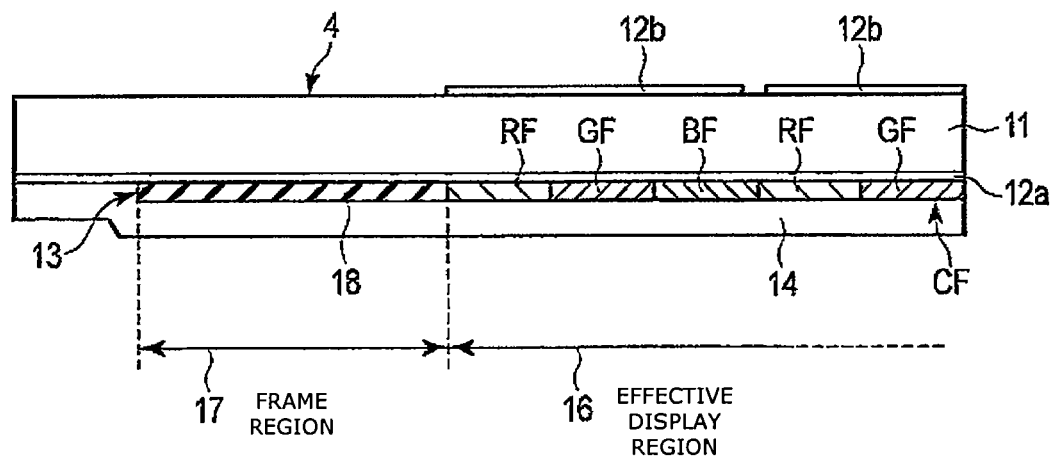
FIG. 11 is a cross sectional view showing an example of a color filter substrate according to the first embodiment.

FIG. 11 is a cross sectional view showing an example of the color filter substrate 4 according to the present embodiment. FIG. 11 represents a cross section taken along A-A' as shown in FIG. 10. The color filter substrate 4 has a configuration in which the transparent electrode layers 12a and 12b are respectively formed on both surfaces of the transparent substrate 11 and the color filter layer 13 and the transparent resin layer 14 are laminated. FIG. 11 represents that, similar to that of above-described FIG. 1, the transparent electrode layer 12b is located at the upper side and the transparent resin layer 13 is located at the lower side. The color filter layer 13 includes red filters RF, green filter GF, blue filters BF and a light shielding layer 18. In the effective display region 16 of the color filter layer 13, a color filter CF is formed. In the frame region 17, a light shielding layer 18 is formed.

The light shielding layer 18 is, for example, a coating film pattern containing carbon pigment as a principal component (main constituent, main agent or major ingredient) of the visible range light shielding color material. In this regard, the principal component of the light shielding color material is a pigment having mass exceeding 50% in mass proportion with respect to the mass of the whole pigment of the light shielding color material.

In the color filter substrate 4 according to the present embodiment, the black matrix BM is formed within the effective display region 16. Therefore, a high precision and uniform color filter CF can be provided.

For example, each of the film thicknesses of the light shielding layer 18, the red filter RF, the green filter GF and the blue filter BF may be set to be approximately 2.5 μm and the film thickness of the transparent resin layer 14 may be set to be 2 μm. According to the present embodiment, the total film thickness of the color filter CF and the transparent resin layer 14 may preferably be within a range from approximately 2.5 µm to 9 µm or a range from approximately 2.5 µm to 4.5 µm. In a case where the liquid crystal molecules L have initial horizontal alignment and using the IPS method, a change in electrical capacitance when the liquid crystal layer 3 is viewed from the thickness direction is significantly small. However, to drive the liquid crystal layer uniformly over the thickness direction, an equipotential line extended from the pixel electrode 9 to which the drive voltage is applied may preferably spread uniformly as much as possible from the pixel electrode 9. When the extent of the equipotential line has a distortion or the density of the equipotential line differs between every color of the color filters, light leaking or unintended coloring of the pixel may occur. In a liquid crystal display device using for example IPS or FFS in which the liquid crystal molecules L rotate parallel with respect to the substrate surface by applying liquid crystal drive voltage to the pixel electrodes 9, for example, as a technique disclosed in patent literature 6, a transparent electrode such as Vcom ITO is provided on the color filter and the transmittance of the liquid crystal display device may decrease.

Figure 12:
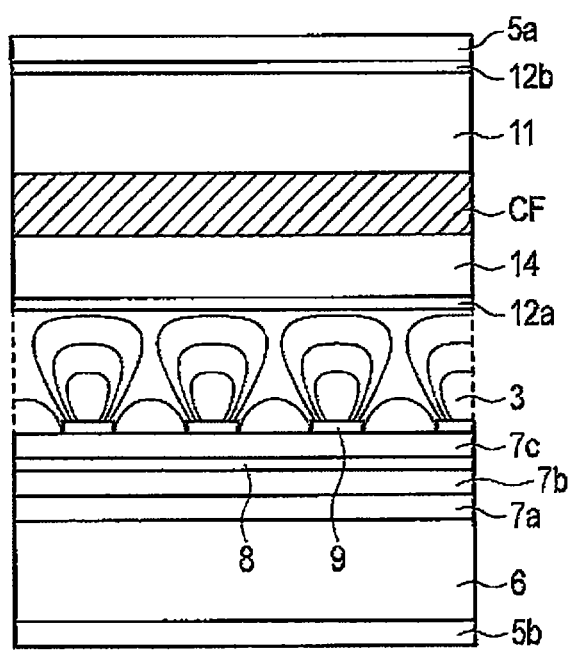
FIG. 12 is a cross sectional view showing an example in which an equipotential line becomes a flat shape in a thickness direction of the liquid crystal layer.

For example, as shown in FIG. 12, in case where a transparent electrode layer (or shield layer) 12a as a conductive film is provided at a position close to the liquid crystal layer 3, the equipotential line becomes a flat shape in the thickness direction of the liquid crystal layer 3. In this case, the liquid crystal molecules L that operate within the liquid crystal layer 3 become very thin, with respect to the thickness direction, whereby transmittance of the liquid crystal display device may decrease, causing a dark display.

On the other hand, it is better to set the total film thickness of the color filter CF provided under the transparent electrode layer 12a and the transparent resin layer 14 to be thick. For example, the total film thickness may preferably be the same thickness as the liquid crystal layer 3, or more. By setting the total film thickness of the color filter CF and the transparent resin layer 14 to be the same thickness as the liquid crystal layer 3 or to be approximately doubled or more, the extent of the equipotential line can be uniform in the liquid crystal layer 3.

Figure 13:
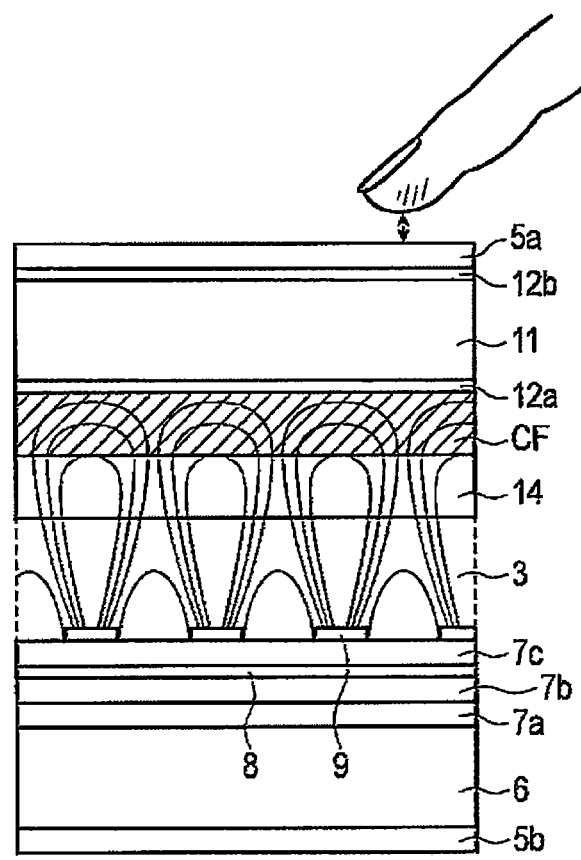
FIG. 13 is a cross sectional view showing an example of a state of the equipotential line according to the first embodiment.

As shown above-described FIG. 12, to avoid the equipotential line from having a flat shape in the thickness direction of the liquid crystal layer 3, the total film thickness of the transparent resin layer and the color filter CF may be in a range, for example, approximately from 2.5 µm to 9 µm. Thus, setting the total film thickness of the transparent resin layer 14 and the color filter CF to be in a range from approximately the same thickness as the liquid crystal layer 5 to double the thickness of the liquid crystal layer 5, as shown in FIG. 13, the extent of the equipotential line extended from the pixel electrode 9 can be extended towards a direction of the color filter CF. Specifically, the color filter CF and the transparent resin layer 14 are set to be thicker, whereby the equipotential line spreads towards the thickness direction so that the number of the liquid crystal molecules L operating (rotating) in the liquid crystal layer 3 increases in the thickness direction. Accordingly, the transmittance of the liquid crystal display device is enhanced, whereby the display can be bright.

In the present embodiment, the red filter RF, the green filter GF and the blue filter BF have a relative dielectric constant ranging from 2.9 to 4.4 when measured at a frequency used for driving the liquid crystal, and the relative dielectric constant of each of the red filter, the green filter and the blue filter may be within a range approximately±0.3 (difference is less than or equal to 0.3) with respect to an average relative dielectric constant of the red filter, the green filter and the blue filter. The difference of the relative dielectric constant is set within this range so that an occurrence of color unevenness can be prevented. When organic pigment having high relative dielectric constant is used as a pigment of the color filter CF, by setting the ratio of a transparent resin that becomes a dispersed base (matrix) of the organic pigment to be high, the relative dielectric of the color filter CF can be lowered. Regarding the color filter CF, within an appropriate range of the film thickness as described above, the relative dielectric constants of respective red filter RF, green filter GF and blue filter BF can be within a small range, whereby display quality for every red filter RF, green filter GF and blue filter BF can be consistent.

For example, the relative dielectric constant of the color filter CF is measured by using an impedance analyzer under a condition of voltage 5 volts, with frequencies of approximately 120, 240 and 480 Hz. The measurement samples are produced such that a color filter CF is coated/cured (the film thickness is set to be the same as that in the embodiment described later) on a glass substrate in which a conductive film including aluminum thin film is pattern-formed and a conductive film pattern including aluminum thin film is further formed on the color filter CF.

High transmittance can be reproduced by a general nematic liquid crystal material and having a large Δ-n value (or a liquid crystal material having large dielectric anisotropy). The lowest thickness of the liquid crystal layer 3 capable of securing a yield at a cell-producing process is appropriately 2.5 µm. The highest thickness of the liquid crystal layer 3 having small Δ-n value in which liquid crystal driving can readily be made is, for example, approximately 4.5 µm. In a case where a horizontal electric field system such as IPS or FFS is used with liquid crystal molecules, the preferable thickness of the liquid crystal layer 3 is, for example, approximately from 2.5 µm to 4.5 µm. In this case, the total film thickness of the color filter CF and the transparent resin layer 14 may preferably be set to be within a range from approximately 2.5 µm which is a thinner film thickness in the practical range of the liquid crystal layer 3 to approximately 9 µm which is a thicker film thickness in the practical range of the liquid crystal layer 3.

Figure 14:
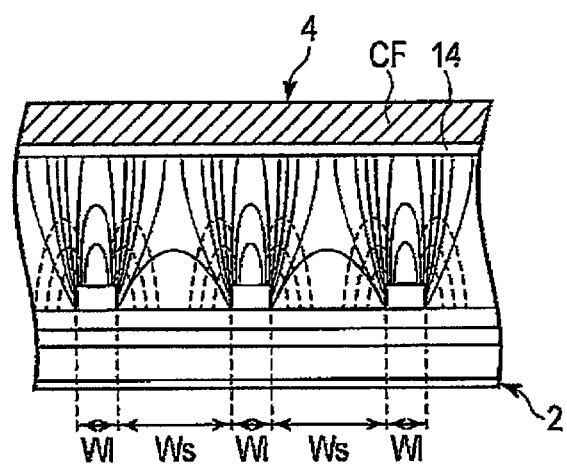
FIG. 14 is a cross sectional view showing an example of a relationship between the width and pitch of the pixel electrode, and the electric lines of force.

FIG. 14 is a cross sectional view showing an example of a relationship between the lateral width Wl and the pitch Ws of the pixel electrode 9. FIG. 14 is cross sectional view sectioned across the horizontal direction.

In the liquid crystal display device using the IPS or FFS method, pixel electrodes 9 and the common electrodes 8 are formed on an array substrate 2 side. For the lateral width Wl and the pitch Ws, the narrower the lateral width Wl and the pitch Ws, the more enhanced is the transmittance of the liquid crystal layer 3. When the liquid crystal drive voltage is applied between the pixel electrodes 9 and the common electrodes 8, by uniformizing the equipotential lines that extend to the color filter CF from the pixel electrodes 9, display of the respective pixels can be uniform. As described, matching the respective relative dielectric constants (electric properties) of the red filter RF, the green filter GF and the blue filter BF, three matched colors can be displayed. The relative dielectric constant of the light shielding layer 18 is preferably close to the respective relative dielectric constants of the red filter BF, the green filter GF and the blue filter BF.

For example, equipotential lines as shown in FIG. 14 with the solid line, microscopically, different potentials are applied to the transparent resin layer 14 and the color filter CF. Also, microscopically, the equipotential lines do not uniformly enter the transparent resin layer 14 and the color filter CF. Therefore, when the liquid crystal drive voltage is applied to the liquid crystal layer 3, non-uniformity of stored charge is likely to occur on the surface of the transparent resin layer 14 which is an insulator. The non-uniformity of the stored charge produces an offset voltage on the surface of the transparent resin layer 14, thereby causing microscopic non-uniformity on the liquid crystal display or a screen burn. However, when alternating current (AC) voltage used for detecting electrostatic capacitance of the touch sensing is applied to the transparent electrode layer 12a, the above-described stored charge is discharged. As a result, the microscopic non-uniformity on the liquid crystal display and the screen burn can be eliminated. The transparent electrode layer 12a brings about these secondarily effects.

Further, according to the present embodiment, in a case where the liquid crystal molecules have negative dielectric anisotropy, even when AC current is applied to the transparent electrode layer 12a, liquid crystal molecules of the liquid crystal layer 3 do not rise so that the image quality does not degrade due to, for example, light leakage.

In the present embodiment, the light shielding layer 18 is a coating film pattern that contains carbon pigment as a principal component of the visible range light shielding color material. The light shielding layer 18 containing a carbon pigment has a high dielectric constant. However, according to the present embodiment, by setting the respective film thicknesses of the red filter RF, the green filter GF and the blue filter BF to be thick and setting the film thickness of the transparent resin layer 14 to be thick, the image quality can be higher. In other words, the occurrence of distortion of the equipotential lines, light leakage and a dark part can be prevented.

For the liquid crystal used in the present embodiment, for example, negative liquid crystal having refractive index anisotropy $\Delta$-n at the wavelength 550 nm of approximately 0.1, the dielectric constant in a direction parallel to the alignment vector of the liquid crystal of approximately 4.1, and a dielectric anisotropy $\Delta\in$ of approximately $-6.1$ can be employed. The thickness of the liquid crystal layer 3 may be approximately 3.5 μm.

Second Embodiment

According to the present embodiment, modifications of the above-described first embodiment will be described.

Figure 15:
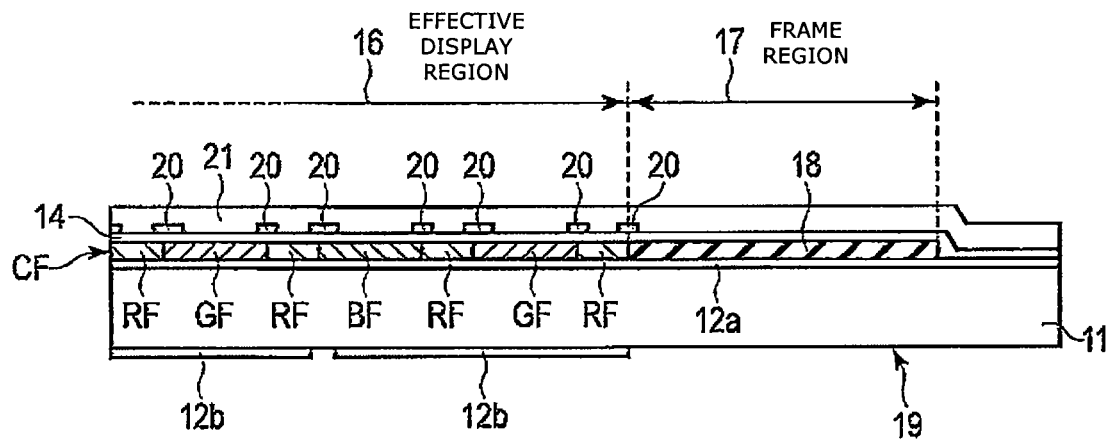
FIG. 15 is a cross sectional view showing an example of a color filter substrate according to the second embodiment.

FIG. 15 is a cross sectional view showing an example of the color filter substrate 19 according to the present embodiment. The color filter substrate 19 has a configuration in which transparent substrate electrode layers 12a and 12b are respectively formed on both surfaces of the transparent substrate 11 and a color filter layer 13, a transparent resin layer 14, a light shielding layer 20 and a transparent resin layer 21 are laminated on the transparent electrode layer 12a. FIG. 15 is illustrated under a condition that the above-described FIG. 11 and the film surface (surface of the color filter CF) are positioned to be opposite from each other, i.e., the transparent electrode layer 12b is positioned to be on the lower side and the transparent resin layer 21 is positioned to be on the upper side.

The major difference between the color filter substrate 4 according to the first embodiment and the color filter substrate 19 according to the present embodiment is that the light shielding layer 20 is formed on the effective display region 16.

The light shielding layer 20 is respectively formed on a part of the red filter RF, a part of the green filter GF and a part of the blue filter BF.

In the present embodiment, the light shielding layer 20 may be provided at respective boundary portions in the red filter RF, the green filter GF and the blue filter BF so as to separate the red filter RF, the green filter GF and the blue filter BF. The light shielding layer 20 may be provided as a black matrix.

The light shielding layer 20 is a coating film pattern containing organic pigment as a principal component of the visible range light shielding color material. The relative dielectric constant of the light shielding layer 20 is smaller than the relative dielectric constant of the light shielding layer 18 containing carbon pigment as a principal component of the visible range light shielding color material. The relative dielectric constant of the light shielding layer 20 can be the same as the respective relative dielectric constants of the red filter RF, the green filter GF and the blue filter BF.

Therefore, when the light shielding layer 20 containing organic pigment as a principal component of the visible range light shielding color material is provided at a position close to the liquid crystal layer 3, a distortion will not occur in the equipotential lines extended from the pixel electrode 9 so that occurrence of light leakage in the vicinity of the light shielding layer 20 can be prevented. In a liquid crystal display device using a liquid crystal layer 3 that includes liquid crystal molecules L having initial state alignment which is horizontal with respect to the substrate surface of the array substrate 2 and rotating parallel with respect to the substrate surface when the liquid crystal drive voltage is applied to a plurality of pixel electrodes 9, the light shielding layer 20 can be disposed at a position close to the liquid crystal layer 3 in the thickness direction. According to the present embodiment, by disposing the light shielding layer 20 containing organic pigment as a principal component of the visible range light shielding color material to be close to the liquid crystal layer 3, light leakage at adjacent pixels which is inherent to a liquid crystal drive for using IPS or FFS methods, and inappropriate coloring, can be suppressed.

Figure 16:
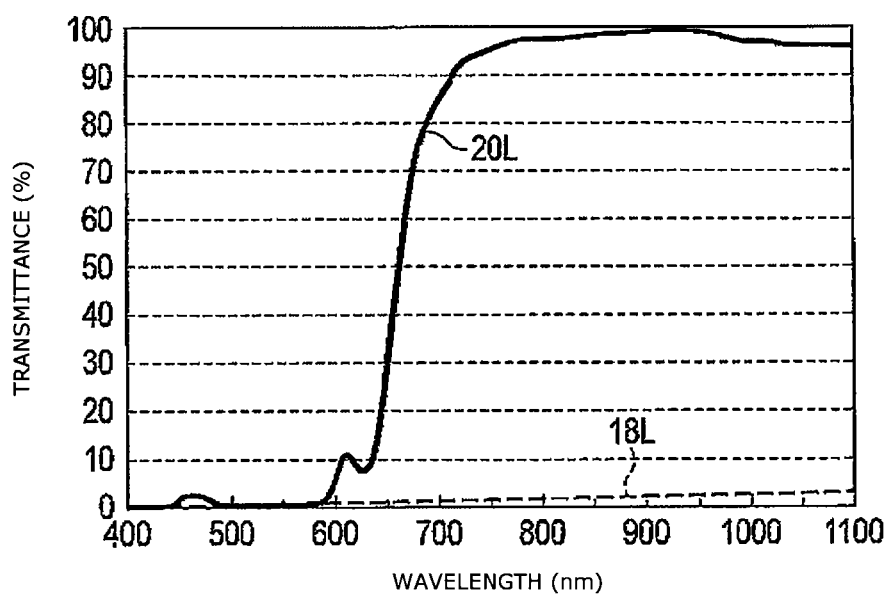
FIG. 16 is a graph showing an example of transmittance characteristics for two types of light shielding layers.

FIG. 16 is a graph showing an example of transmittance properties 18L of the light shielding layer 18 and transmittance properties 20L of the light shielding layer 20. The transmittance properties 20L of the light shielding layer 20 exemplifies transmittance properties in which a plurality of organic pigments are mixed and dispersed.

The light shielding layer 20 containing organic pigment as a main light shielding color material has transmittance properties that allow light having a wavelength longer than, for example, 680 nm or 780 nm to be transmitted therethrough. Hence, the light shielding layer 20 has the properties of an infrared transmission filter.

The light shielding layer 18 containing carbon as a main light shielding color material has properties 18L that shields light in a visible light wavelength range and also shields light at a long wavelength side which is longer than the visible light wavelength range including the infrared region.

The wavelength at which the transmittance properties 20L of the light shielding layer 20 rises to reach the half value (transmittance 50%) may be set from approximately 670 nm to 750 nm by selecting from, or mixing various types of organic pigments.

Figure 17:
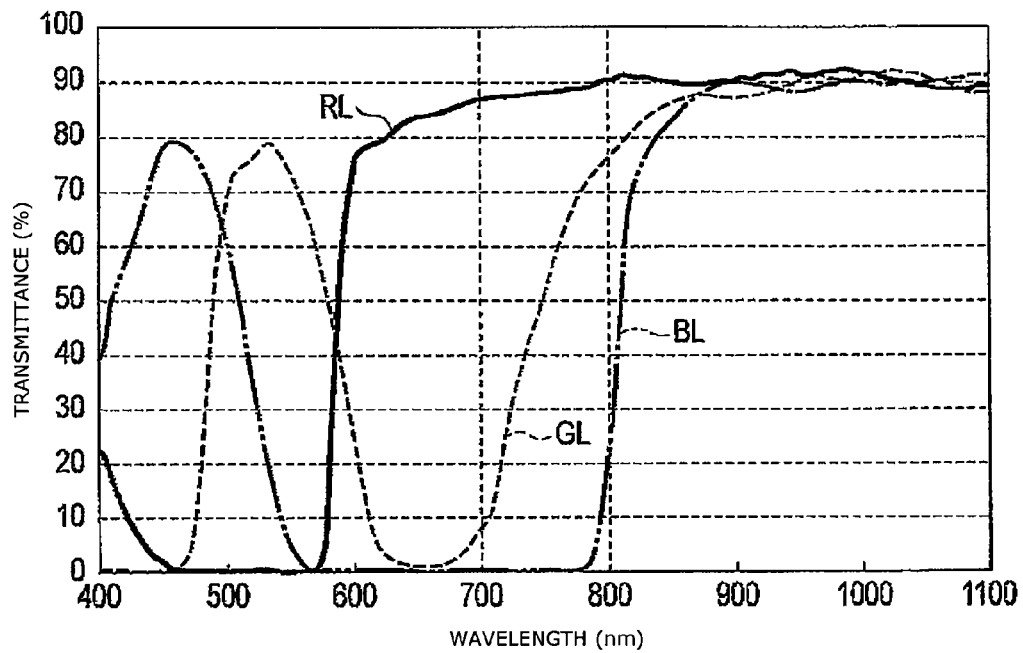
FIG. 17 is a graph showing an example of transmittance characteristics of color filters according to the second embodiment.

FIG. 17 is a graph showing an example of transmittance properties of a color filter CF according to the present embodiment.

The color filter CF includes red filters RF, green filters GF and blue filters BF. The transmittance properties of the red filter RF are labeled RL. The transmittance properties of the green filter GF are labeled GL. The transmittance properties of the blue filter BF are labeled BL.

The transmittance of the red filter RF, the green filter GF and the blue filter BF greatly differ in longer wavelength side which is longer than 700 nm to 1100 nm.

Therefore, when a liquid crystal display device including an optical sensor is used for a color copier or an image pick up device, for example, in a wavelength range near infrared region which is approximately 700 nm to 1100 nm, it is difficult to perform high precision color separation of red, green and blue, if receiving light is not eliminated.

When semiconductor material such as amorphous silicon or poly silicon included in a thin film transistor is used for a photo diode, the photo diode is able to detect light having wavelength region ranging from light wavelength approximately 400 nm to 1100 nm.

Figure 18:
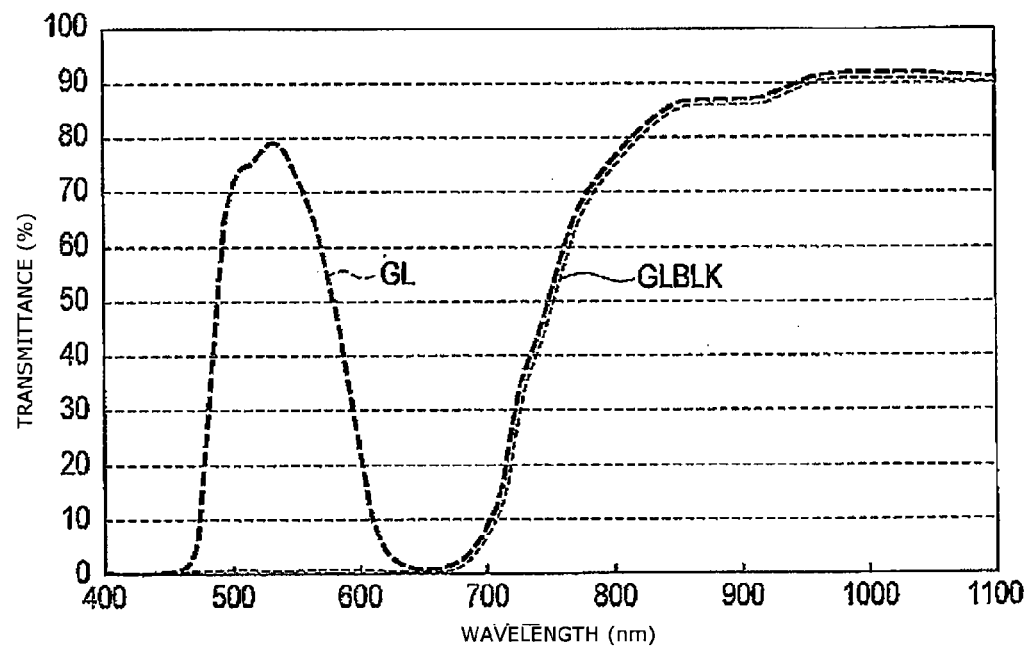
FIG. 18 is a graph showing an example of transmittance characteristics of a green filter and transmittance characteristics of the green filter and the light shielding layer are optically overlapped.

FIG. 18 is a graph showing an example of transmittance properties GL of the green filter GL and transmittance properties GLBLK in which the green filter GF and the light shielding layer 20 are optically overlapped.

A portion where respective single color layers corresponding to the red filter RF, the blue filter BF and the green filter GF which are included in the color filter CF and the light shielding layer 20 are overlapped to detect light may be named as an optical overlapped portion.

The high precision green detection data in the visible light region is obtained by subtracting detection data of light detected by optically overlapping the green filter GF and the light shielding layer 20 from the detection data of light detected using the green filter GF.

Thus, detection data of light detected by optically overlapping the green filter GF and the light shielding layer 20 is subtracted from the detection data of light detected using the green filter GF, whereby only green detection data in the visible light region can be extracted.

Figure 19:
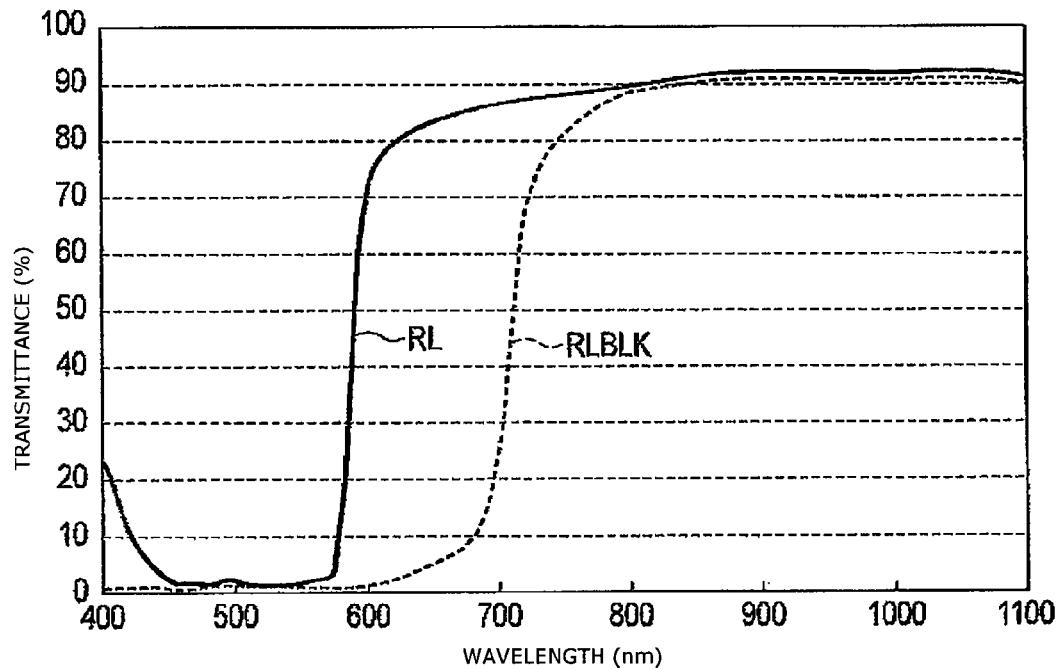
FIG. 19 is a graph showing an example of transmittance characteristics of a red filter and transmittance characteristics of the red filter and the light shielding layer are optically overlapped.

FIG. 19 is a graph showing an example of transmittance properties RL of the red filter RF and transmittance properties RLBLK in which the red filter RF and the light shielding layer 20 are optically overlapped.

The high precision red detection data in the visible light region is obtained by subtracting detection data of light detected by optically overlapping the red filter RF and the light shielding layer 20 from the detection data of light detected using the red filter GF.

Thus, detection data of light detected by optically overlapping the red filter RF and the light shielding layer 20 is subtracted from the detection data of light detected using the red filter RF, whereby only red detection data in the visible light region can be extracted.

Figure 20:
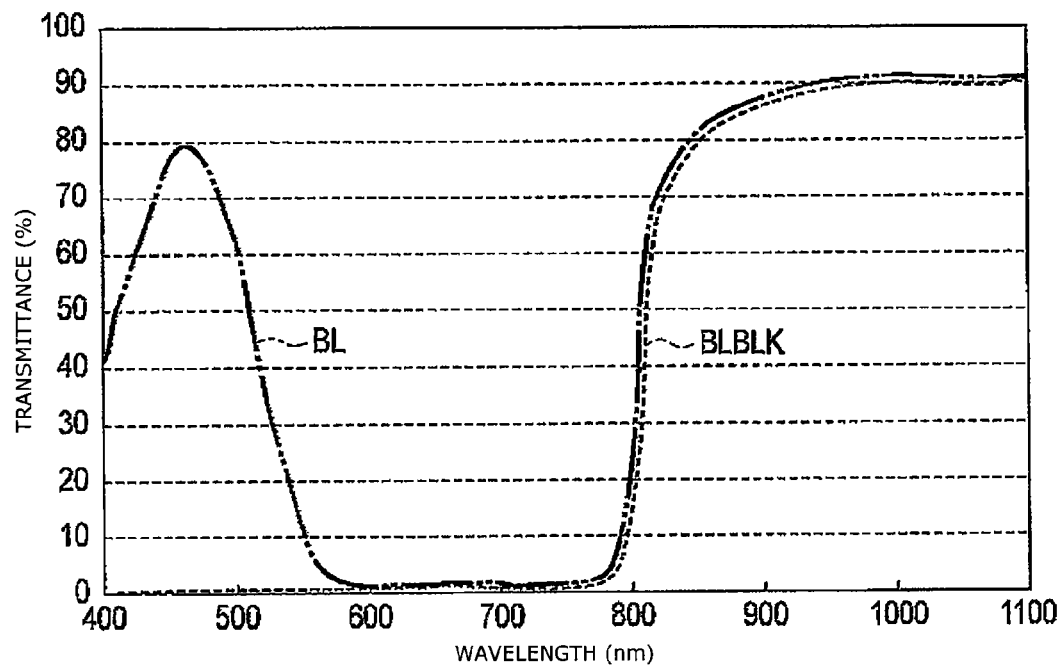
FIG. 20 is a graph showing an example of transmittance characteristics of a blue filter and transmittance characteristics of the blue filter and the light shielding layer are optically overlapped.

FIG. 20 is a graph showing an example of transmittance properties BL of the blue filter BF and transmittance properties BLBLK in which the blue filter BF and the light shielding layer 20 are optically overlapped.

The high precision blue detection data in the visible light region is obtained by subtracting detection data of light detected by optically overlapping the blue filter BF and the light shielding layer 20 from the detection data of light detected using the blue filter BF.

Thus, detection data of light detected by optically overlapping the blue filter BF and the light shielding layer 20 is subtracted from the detection data of light detected using the blue filter BF, whereby only blue detection data in the visible light region can be extracted.

Figure 21:
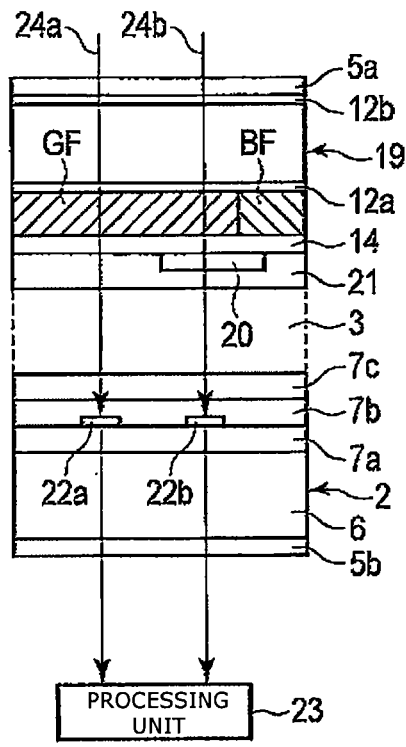
FIG. 21 is a cross sectional view showing an example of a plurality of optical sensors and a processing unit.

FIG. 21 is a cross sectional view showing an example of a plurality of optical sensors 22a and 22b and a processing unit 23.

The optical sensor 22a generates detection data of light 24a transmitted through the green filter GF. The optical sensor 22b generates detection data of light 24b transmitted through the green filter GF and the light shielding layer 20.

The detection data of the optical sensor 22a includes photosensitive component of green and photosensitive component of near infrared region. However, the processing unit 23 subtracts detection data of the optical sensor 22b from detection data of the optical sensor 22a, thereby extracting detection data of only the green component in the visible light region. It should be noted that by replacing the green filter GF by the red filter RF or the blue filter BF, the red component or blue component in the visible light region can be extracted respectively.

According to the present embodiment, the position of the light shielding layer 20 is close to the liquid crystal layer 3 except for the transparent resin layer 21 and an alignment film (not shown) among elements that constitutes the color filter substrate 19. The position of the light shielding layer 20 is able to obtain an effect that reduces color mixture due to adjacent pixels in an IPS-system liquid crystal display device having long propagating distance of liquid crystal motion in a direction being parallel to the substrate surface and in the horizontal direction. In other words, the light shielding layer 20 has an effect that reduces light leakage due to crosstalk while driving adjacent pixels.

Third Embodiment

In the present embodiment, hereinafter will be described modifications of the first and second embodiments described above. According to the present embodiment, modifications of the color filter 4 are described. Similarly, modifications can be applied to the color filter 19. Further, in the present embodiment, a manufacturing method of the color filter substrate is described as well.

According to the present embodiment, a plurality of pixels may include a pixel of which width in the horizontal direction (hereinafter referred to as horizontal width) is ½ that of other pixels. The pixel having ½ horizontal width has its long side in the longitudinal direction. However, the plurality of pixels may include, as an alternative to a pixel having an elongated shape in the longitudinal direction, pixels of which width in the longitudinal direction (hereinafter referred to as longitudinal width) is ½ that of other pixels. In this case, the pixels having ½ longitudinal width have a long side in the horizontal direction.

Figure 22:
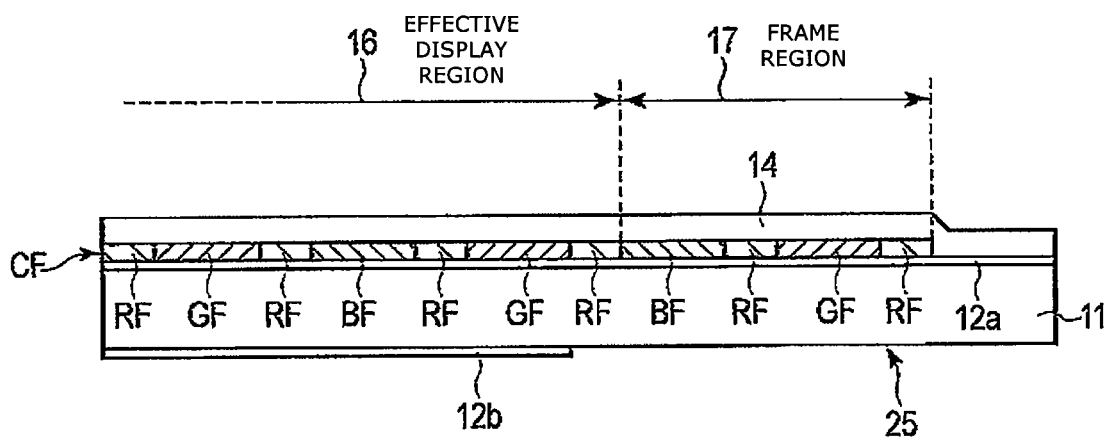
FIG. 22 is a cross sectional view showing an example of a color filter substrate according to the third embodiment.

FIG. 22 is a cross sectional view showing an example of the color filter substrate 25 according to the present embodiment.

The color filter substrate 25 is provided with color filters CF in both the effective display region 16 and the frame region 17. Therefore, a manufacturing step for forming the light shielding film 18 in the frame region 17 can be removed so as to optimize the manufacturing method.

In the color filter substrate 25, the horizontal width of the red filter RF which is formed first among the red filter RF, the green filter GF and the blue filter BF is set to be approximately ½ size of the horizontal widths of other filters, i.e., green filter GF and blue filter BF.

According to the present embodiment, the frame region 17 of the color filter substrate 25 may be formed by a dummy pattern.

In the color filter substrate 25, the red filter RF is provided between the green filter GF and the blue filter BF in plan view so as to separate the green filter GF and the blue filter.

Figure 23A:
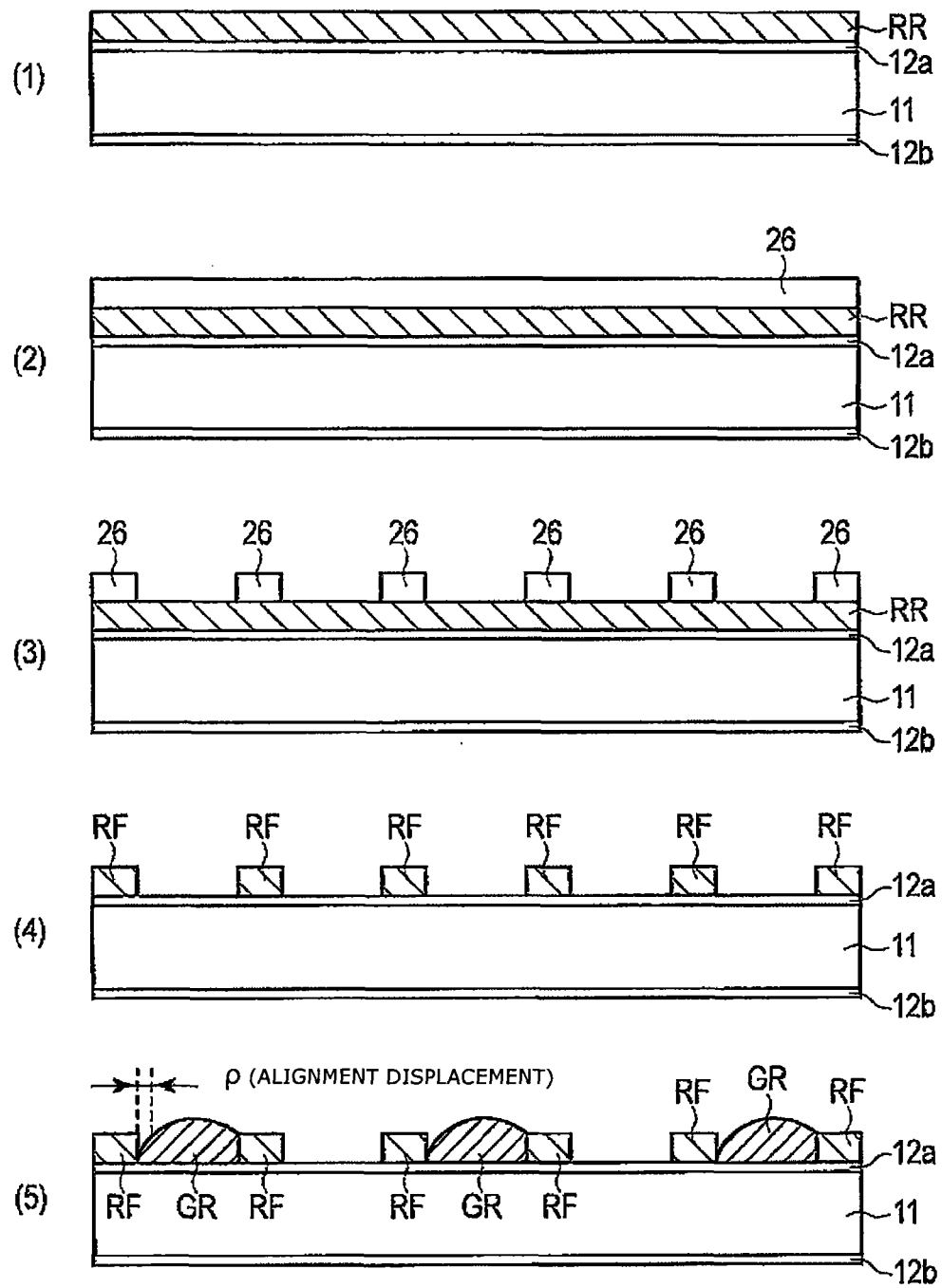
FIG. 23A is a cross sectional view showing an example of respective intermediate products corresponding to manufacturing steps of a manufacturing method of a color filter substrate according to the third embodiment.
Figure 23B:
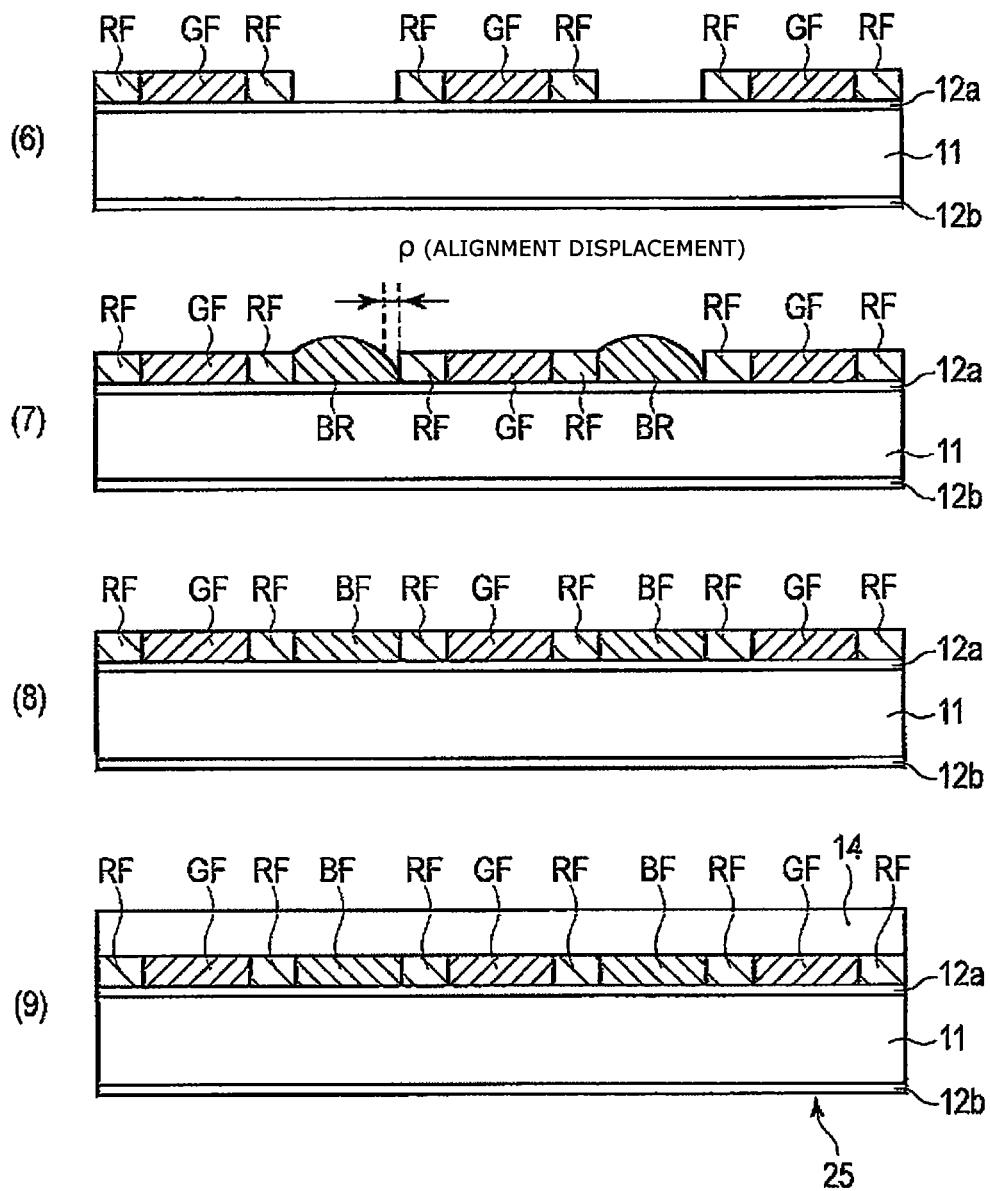
FIG. 23B is a cross sectional view showing an example of respective intermediate products corresponding to manufacturing steps of a manufacturing method of a color filter substrate according to the third embodiment.

FIG. 23A and FIG. 23B are cross sectional views showing an example of respective intermediate products from manufacturing steps of the manufacturing method of the color filter substrate 25 according to the present embodiment.

The manufacturing apparatus of the color filter substrate 25 includes, for example, a coater, a dryer, an exposure apparatus, a developer, a curing apparatus, a sputtering apparatus or the like. As a typical dryer and curing apparatus, a clean oven and a hot plate are used.

According to the present embodiment, a first color filter is formed by a dry etching method. However, the first color filter maybe formed by well-known photolithography method.

As shown in FIG. 23A (1), the transparent electrode layers 12a and 12b are formed on both surfaces of the transparent substrate 11. Moreover, a red resist (red photosensitive colorant composition) RR is formed on the transparent electrode layer 12a. For example, the red resist RR is coated on whole surface of the transparent substrate 11 to set the coated film thickness after drying to be approximately 2.5 µm, and then dried and cured.

Subsequently, as shown in FIG. 23A (2), a positive type photosensitive resist layer 26 is formed.

Next, as shown in FIG. 23A (3), a positioning with respect to, for example, an end surface of the substrate is performed so as to form the positive type photosensitive resist layer 26 to be in a line shaped pattern. This line shaped pattern is the same as the line shaped pattern of the red filter. The line shaped pattern or alignment marks are formed by, for example, a well-known photolithography method. At this time, alignment marks having a cross shape are formed by using, for example, the red resist RR.

Next, as shown in FIG. 23A (4), the red resist RR is dry-etched together with a line shaped pattern of positive type photosensitive resist layer 26. Thus, the red filter RF having a line shape is formed.

The line shape of the positive type photosensitive resist layer 26 is removed when etching is performed. However, a part of the line shape pattern of the positive type photosensitive resist layer 26 may be kept, or the line shape pattern of the positive type photosensitive resist layer 26 may be removed by a resist remover.

The end timing of the etching can be determined by detecting the transparent electrode layer 12a. To produce a vertical cross sectional shape of the red filter RF, anisotropic etching in which etching is performed in the vertical direction may preferably be used for the etching. The shape of the cross section of the red filter RF can be controlled by selecting the composition of gas used for the etching apparatus, an etching rate or a magnetic field condition.

Next, as shown in FIG. 23A (5), the green resist GR is formed on a substrate to be processed. For example, the green resist GR is coated so as to make the film thickness after drying approximately 2.5 µm. Subsequently, positioning is performed on the substrate by using the alignment marks, exposure by the exposure apparatus and developing by the developer, whereby the green filter GF is formed between two red filters RF as shown in FIG. 23B (6).

Thermal flow properties (fluidization by thermal processing) are applied to the green resist GR and the green filter GF is formed from the green resist GR by thermal curing, whereby a positioning displacement ρ which is an alignment error can be nullified as shown in FIG. 23A (5) and FIG. 23A (6). Hence, a flat green filter GF can be formed. The manufacturing steps to form the green filter GF such as developing or curing are the same as that for forming the red filter RF.

Next, as shown in FIG. 23B (7), the blue resist BR is formed on the substrate to be processed. For example, the blue resist is coated so as to make the film thickness after drying approximately 2.5 µm. Subsequently, the substrate is dried by the dryer, positioned using the alignment marks, exposed by the exposure apparatus and developed by the developer, whereby the blue filter BF is formed between two red filters RF as shown in FIG. 23B (8).

Thermal flow properties are applied to the blue resist BR and the blue filter BF is formed from the blue resist BR by thermal curing, whereby a positioning displacement ρ which is an alignment error can be absorbed as shown in FIG. 23B (7) and FIG. 23B (8). Hence, a flat blue filter GF can be formed. The manufacturing steps to form the blue filter BF such as developing or curing are the same as that for forming the red filter RF.

The red pigment contained in the red resist RR and the red filter RF differ from a green pigment and a blue pigment which represent halogenated phthalocyanine pigments, and has less halogen and metal (central metal used for pigment structure) contained in the pigment structure, and the red pigment is suitable for dry etching. In other words, the red pigment is likely to suppress contamination due to halogen or metal when etching is applied. Generally, a blue resist BR (blue colorant composition) used for forming the blue filter BF is likely to flow when thermal curing is applied. Therefore, as described above, the blue filter BF may preferably be formed in the second step or later in an order of forming the plurality of color filters. Usually, the red filter RF and the green filter GF have transmittance higher than that of the blue filter. Accordingly, a line width of at least either red filter RF or green filter GF may be set to ½ of the line width of the blue filter BF and the filter having ½ line width may be separated to be disposed. Since blue color has low visual sensitivity, it is preferable to avoid setting the line width of blue to ½ width.

Fourth Embodiment

In the present embodiment, modifications of the color filter substrate 4, 19 and 25 according to the above-described first, second and third embodiments will be described.

Figure 24:
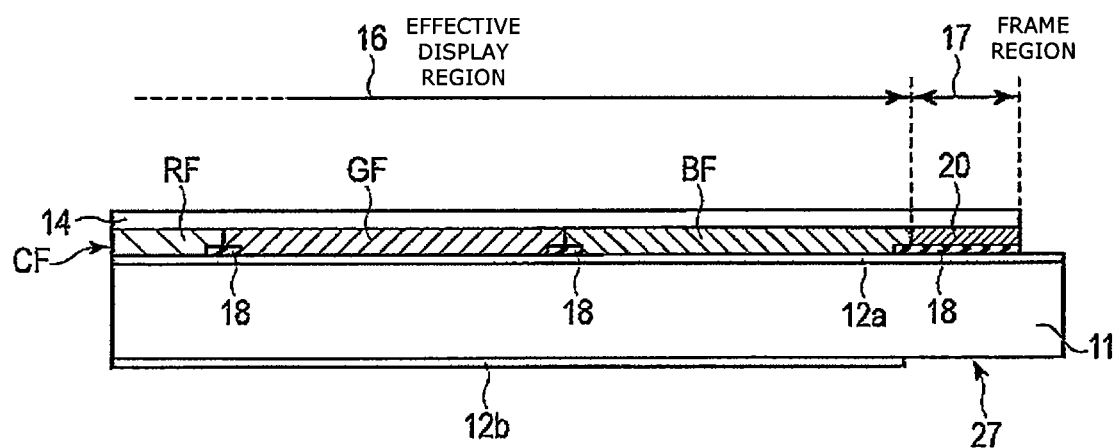
FIG. 24 is a cross sectional view showing an example of a color filter substrate according to the fourth embodiment.

FIG. 24 is a cross sectional view showing an example of a color filter substrate according to the present embodiment.

In the effective display region 16, a light shielding layer 18 having a film thickness approximately 1 µm is formed on the transparent electrode layer 12a as a black matrix. A red filter RF, a green filter GF and a blue filter BF each having approximately 3 µm film thickness are formed on the transparent electrode layer 12a where the light shielding layer 18 is formed.

In the frame region 17, a light shielding layer 18 having a film thickness of approximately 1 µm is formed on the transparent electrode layer 12a. A light shielding layer 20 having a film thickness of approximately 2 µm is formed on the transparent electrode layer 12a where the light shielding layer 18 is formed.

According to the present embodiment, the light shielding layer 18 in the effective display region 16 and the light shielding layer 18 in the frame region 17 are formed with the same process and the same material.

The thickness of the red filter RF, the green filter GF, the blue filter BF in the effective display region 16 and the light shielding layers 18 and 20 in the frame region 17 are about the same so that the flatness is maintained.

Further, a transparent resin layer 14 is formed on the red filter RF, the green filter GF, the blue filter BF in the effective display region 16 and the light shielding layers 18 and 20 in the frame region 17.

The color filter CF includes the red filter RF, the green filter GF, the blue filter BF and the light shielding layer 18 in the effective display region 16.

According to the present embodiment, the film thickness of the light shielding layer 18 in the effective display region 16 is formed, for example, thinner than approximately 1.5 µm so as to maintain the flatness of the color filter CF.

The light shielding layer 20 containing organic pigment as a main light shielding color material may be formed on any locations corresponding to the red filter RF, the green filter GF and the blue filter BF in the effective display region.

Fifth Embodiment

In the present embodiment, materials such as the transparent resin and organic pigment used for the color filter substrates 4, 19, 25 and 27 according to the above-described first, second, third and fourth embodiments and a manufacturing method of the color filter substrates 4, 19, 25 and 27 will be described.

According to the present embodiment, a manufacturing method of the color filter substrate 4 is described as a typical example. However, the same manufacturing method can be applied to other color filter substrates 19, 25 and 27.

<Transparent Resin>

The photosensitive colorant composition used for forming the color filter CF such as light shielding layers 18 and 20, red filter RF, green filter GF and blue filter BF contains, in addition to a pigment dispersion (hereinafter referred to as paste), polyfunctional monomer, photosensitive resin or non-photosensitive resin, polymerization initiator, a solvent and the like. For example, an organic resin having high transparency such as photosensitive resin or non-photosensitive resin is called a transparent resin.

As a transparent resin, a thermoplastic resin, a thermosetting resin or a photosensitive resin can be used. As a thermoplastic resin, for example, a butyral resin, styrene-maleic acid copolymer, a chlorinated polyethylene, chlorinated polypropylene, polyvinyl chloride, polyvinyl chloride-vinyl acetate copolymer, polyvinyl acetate, polyurethane resin, polyester resin, acrylic resin, alkyd resin, polystyrene resin, polyamide resin, rubber based resin, cyclized rubber based resin, cellulose compounds, polybutadiene, polyethylene, polypropylene, polyimide resin or the like can be used. As a thermosetting resin, for example, epoxy resin, benzoguanamine resin, rosin-modified maleic acid resin, rosin-modified fumaric acid resin, melamine resin, urea resin, phenol resin or the like can be used. The thermosetting resin may be produced by reacting melamine resin with a compound containing isocyanate group.

<Alkali Soluble Resin>

For forming a light shielding film such as light shielding layer 18 and 20, the transparent resin layers 9, 9a and the color filter CF according to the present embodiment, a photosensitive resin composition capable of forming a pattern by photolithography may preferably be used. For these transparent resins, a resin which is alkali soluble may preferably be used. As an alkali soluble resin, a resin containing carboxyl group or hydroxyl group may be used or other resins may be used as well. As an alkali soluble resin, for example, epoxy acrylate based resin, novolac based resin, polyvinyl phenol resin, acrylic resin, epoxy resin containing carboxyl group, urethane resin containing carboxyl group or the like may be used. Among these, as an alkali soluble resin, alkali soluble resin, novolac based resin, acrylic resin may preferably be used. In particular, epoxy acrylate based resin or novolac based resin may preferably be used.

<Organic Pigment>

As a red pigment, for example, C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279 or the like can be used.

As a yellow pigment, for example, C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214 or the like can be used.

As a blue pigment, for example, C.I. Pigment Blue 15, 15:1, 15:2, 15:3, 15:4, 15:6, 16, 22, 60, 64, 80 or the like can be used. Among these, C.I. Pigment Blue 15:6 may preferably be used.

As a violet pigment, for example, C.I. Pigment Violet 1, 19, 23, 27, 29, 30, 32, 37, 40, 42, 50 or the like can be used. Among these, C.I. Pigment Violet 23 may preferably be used.

As a green pigment, for example, C.I. Pigment Green 1, 2, 4, 7, 8, 10, 13, 14, 15, 17, 18, 19, 26, 36, 45, 48, 50, 51, 54, 55, 58 or the like can be used. Among these, C.I. Pigment Green 58 which is halogenated zinc phthalocyanine green pigment may preferably be used. As a green pigment, halogenated aluminum phthalocyanine green pigment may be used.

<Light Shielding Color Material>

A color material having light shielding properties included in the light shielding layers 18 and 20 has absorbability in the visible light wavelength region and includes light shielding function. In the present embodiment, as a color material having light shielding properties, for example, organic pigment, an inorganic pigment or a dye can be used. As an inorganic pigment, for example, carbon black, titanium oxide or the like can be used. As a dye, azo dye, anthraquinone dye, phthalocyanine dye, quinone imine dye, quinolone dyes, nitro dye, carbonyl dye, methane dye or the like can be used. Regarding the organic pigment, for example, the above-described organic pigments can be employed. Regarding the light shielding component, one type of component may be used or two or more types of component can be combined with an appropriate ratio.

<An Example of Black Resist 1 Applied to Light Shielding Layer 18>

An example of preparing a black paste (dispersion) used for the light shielding layer 18 containing carbon pigment as a principal component of the light shielding color material is described.

A mixture having the following composition is stir-mixed and stirred by a beads mill dispersing machine, and then the black paste is prepared. Each of the compositions is expressed by part mass.

carbon pigment 20 pts.
dispersing agent 8.3 pts.

copper phthalocyanine derivative 1.0 pts.
propylene glycol monomethyl ether acetate 71 pts.

By using the above-described black paste, the mixture having the following composition is stir-mixed uniformly and filtered by a 5 μm filter, whereby the black resist 1 is prepared to be applied to the light shielding layer 18. It is noted that the resist represents a photosensitive colorant composition containing carbon or organic pigment.

black paste 25.2 pts.
acrylic resin paste solution 18 pts.
dipenta pentaerythritol and hexa-acrylate 5.2 pts.
photoinitiator 1.2 pts.
sensitizer 0.3 pts.
leveling agent 0.1 pts.
cyclohexanone 25 pts.
propylene glycol monomethyl ether acetate 25 pts.

In the present embodiment, the main constituent of the color material (pigment) in the black resist 1 or color resist represents a color material accounting for more than or equal to 50% with respect to the ratio (%) of the total mass of the color material contained in the resist. For example, in the black resist 1, carbon accounts for 100% of the color material so that the carbon is determined as the major color material. Also, in black resist 1 of which the major color material is carbon pigment, in order to adjust the gradation of color or the reflected color, organic pigments such as red, yellow and blue may be added with a ratio of the total mass equal to or less than 10%.

<Example of Black Resist 2 Used for Light Shielding Layer 20>

As a principal component of the light shielding color material, an example of mixture of organic pigment used for the light shielding layer 20 containing organic pigment is shown as below.

C.I. pigment red 254 (hereinafter abbreviated as R254)
C.I. pigment yellow 139 (hereinafter abbreviated as Y139)
C.I. pigment violet 23 (hereinafter abbreviated as V23)

Among these three types of pigments, pigment R-254 may be omitted. Further, other than these three types of pigments, a small amount of other types of pigment for adjusting color (transparent wavelength), for example, the above-described pigments with amount of 20% or less may be added thereto.

For example, a small amount of green pigments such as halogenated zinc phthalocyanine or halogenated aluminum phthalocyanine may be used to adjust a rising of the transmittance properties around light wavelength 700 nm in the light shielding layer 20 (adjusting a shape of the spectrum curve). Adjusting the rising of the transmittance properties, optimized infrared region transparency can be provided to the light shielding layer 20.

The light shielding layer 20 may preferably have a transmittance in the visible light region of 5% or less. The visible light region usually has a light wavelength range approximately from 400 nm to 700 nm. In order to set the half-value wavelength of the light shielding layer 20 to be within a light wavelength range from approximately 670 nm to 750 nm, the infrared light transmittance properties should rise around light wavelength 660 nm and the transmittance properties at the long wavelength side should be high. A wavelength range of low transmittance of the light shielding layer 20 may be in a light wavelength range from approximately 400 nm to 650 nm. The transmittance of the light shielding layer 20 of a low value, e.g., 5% or less in the light wavelength ranging approximately from 400 nm to 650 nm can be set extremely easily by increasing an amount of pigment contained in the light shielding layer 20 or setting the film thickness of light shielding layer 20 to be thicker. Similarly, a wavelength position of the half-value wavelength can readily be adjusted based on an amount of pigment, composition ratio of a violet pigment, a green pigment, yellow pigment and a red pigment (described later), and the thickness of the light shielding layer 20. As a green pigment applied for the light shielding layer 20, various green pigments which are described later can be applied. In order to set the half-value light wavelength of the light shielding layer 20 to be within a light wavelength range from 670 nm to 750 nm, it is preferable to use a green pigment in which the rising of light or transmittance of near infrared light (e.g., half-value wavelength) is within a light wavelength range from 700 nm to 800 nm. An adjustment for setting the half-value wavelength to be in a light wavelength range from 670 nm to 750 nm can be achieved based on mainly the violet pigment and the green pigment. To adjust the transmittance properties of the light shielding layer 20, a blue pigment may be added.

The mass ratio (%) of R254 may be, for example, within a range from 0 to 20%.
The mass ratio (%) of Y139 may be, for example, within a range from 20 to 50%.
The mass ratio (%) of V23 may be, for example, within a range from 40 to 75%.

Prior to generating color resist (colored composition) based on these pigments, the pigment is dispersed into resin or solution and pigment paste (dispersant) is produced. For example, to disperse simple substance of pigment Y139 into resin or solution, the following material is mixed to 7 pts. of pigment R139 (pts. mass).

acrylic resin solution (solid content 20%): 40 pts.
dispersing agent: 0.5 pts.
cyclohexanone: 23.0 pts.

It is noted that other pigments such as V23 or R254 may be dispersed into the same resin or solution so as to produce a black pigment dispersion paste.

Hereinafter, the composition ratio for producing the black resist based on the above-described pigment dispersion paste is exemplified as follows.

Y139 paste: 14.70 pts.
V23 paste: 20.60 pts.
acrylic resin solution: 14.00 pts.
acrylic monomer: 4.15 pts.
initiator: 0.7 pts.
sensitizer: 0.4 pts.
cyclohexanone: 27.00 pts.
PGMAC: 10.89 pts.

By using the above-described composition ratio, a black resist 2 used for the light shielding layer 20 is formed.

For the black resist 2 containing organic pigment as a principal component of the light shielding color material, which is used for forming the light shielding layer 20, to adjust light shielding properties, carbon pigment may be added to the black resist 2, to be 40% or less of total mass.

<Example of Red Resist RR1 Used for Color Filter Substrates 4, 19, 25 and 27>

<Preparing Red Paste 1>

Hereinafter will be described an example of preparing the red paste 1 (dispersion).

A mixture having the following composition is stir-mixed uniformly, dispersed for 5 hours by a sand mill using glass beads of 1 mm in diameter and filtered using an approximately 5 μm filter, thereby producing the red paste 1.

red pigment C.I. Pigment Red 254: 8 pts.
red pigment C.I. Pigment Red 177: 10 pts.

yellow pigment C.I. Pigment Yellow 150: 2 pts.
dispersion: 2 pts.
acrylic varnish (containing solid content of 20 mass %): 108 pt.

<Preparing Red Resist RR1>

After preparing the red paste 1, the mixture having the following composition is stir-mixed to be uniform, and filtered using a filter of approximately 5 μm, thereby producing the red resist RR1.
red paste: 42 pts.
acrylic resin solution: 18 pts.
dipenta pentaerythritol and hexa-acrylate: 4.5 pts.
photoinitiator: 1.2 pts.
sensitizer: 2.0 pts.
cyclohexanone: 32.3 pts.

<Example of Red Resist RR2 Used for Color Filter Substrate 4, 19, 25, 27>
<Preparing Red Paste 2>

An example of preparing the red paste 2 (dispersion liquid) is described as follows.

The red paste 2 is prepared by using the following mixture and the same method as that of the red paste 1.
red pigment C.I. Pigment Red 254: 11 pts.
red pigment C.I. Pigment Red 177: 9 pts.
dispersion: 2 pts.
acrylic varnish (containing solid content of 20 mass %): 108 pts.

<Preparing Red Resist RR2>

The red resist RR2 is prepared by using the red paste 2 instead of the red paste 1 and a method as same as that of the red resist RR1.

<Example of Green Resist GR1 Used for Color Filter Substrates 4, 19, 25 and 27>
<Preparing Green Paste 1>

A mixture having the following composition is stir-mixed uniformly, dispersed for 5 hours by a sand mill using glass beads of 1 mm in diameter and filtered by an approximately 5 μm filter, thereby producing the green paste (dispersion liquid).
green pigment C.I. Pigment Green 58: 10.4 pts.
yellow pigment C.I. Pigment Yellow 150: 9.6 pts.
dispersion: 2 pts.
acrylic varnish (containing solid content of 20 mass %): 66 pt.

<Preparing Green Resist GR1>

After preparing the green paste 1, the mixture having the following composition is stir-mixed to be uniform, and filtered using a filter of approximately 5 μm, thereby producing the green resist GR1.
green paste 1: 46 pts.
acrylic resin solution: 8 pts.
dipenta pentaerythritol and hexa-acrylate: 4 pts.
photoinitiator: 1.2 pts.
photoinitiator: 3.5 pts.
sensitizer: 1.5 pts.
cyclohexanone: 5.8 pts.
propylene glycol monomethyl ether acetate 30 pts.

For example, the green resist GR can be used with fluorochemical surfactant 0.08 pts. added thereto.

<Example of Green Resist GR2 Used for Color Filter Substrates 4, 19, 25 and 27>
<Preparing Green Paste 2>

An example of preparing the green paste 2 (dispersion liquid) is described as follows.

The green paste 2 is prepared by using the following mixture and the same method as that of the green paste 1.
green pigment C.I. Pigment Green 58: 10.4 pts.
yellow pigment C.I. Pigment Yellow 150: 3.2 pts.
yellow pigment C.I. Pigment Yellow 138: 7.4 pts.
dispersion: 2 pts.
acrylic varnish (containing solid content of 20 mass %): 66 pts.

<Preparing Green Resist GR2>

The green resist GR2 is prepared by using the green paste 2 instead of the green paste 1 and the method as that of the green resist GR1.

<Example of Blue Resist BR1 Used for Color Filter Substrates 4, 19, 25 and 27>
<Preparing Dispersion Element of Blue Paste 1>

A mixture having the following composition is stir-mixed uniformly, dispersed for 5 hours by a sand mill using glass beads of 1 mm in diameter and filtered by an approximately 5 μm filter, thereby producing the blue paste 1 (dispersion element of blue pigment).
blue pigment C.I. Pigment Blue 15:6: 52 pts.
dispersion: 6 pts.
acrylic varnish (containing solid content of 20 mass %): 200 pts.

<Preparing Blue Resist BR1>

After preparing the blue paste 1, the mixture having the following composition is stir-mixed to be uniform, and filtered by a filter of approximately 5 μm, thereby producing the blue resist BR1.
blue paste: 16.5 pts.
acrylic resin solution: 25.3 pts.
dipenta pentaerythritol and hexa-acrylate: 1.8 pts.
photoinitiator: 1.2 pts.
sensitizer: 0.2 pts.
cyclohexanone: 25 pts.
propylene glycol monomethyl ether acetate 30 pts.

<Example of Blue Resist BR2 Used for Color Filter Substrate 4, 19, 25 and 27>
<Preparing Blue Paste 2>

A mixture having the following composition is dispersed for 5 hours by a mill and filtered using an approximately 5 μm filter, thereby producing the intermediate blue paste (dispersion liquid).
blue pigment C.I. Pigment Green15: 49.4 pts.
dispersion: 6 pts.
acrylic varnish (containing solid content of 20 mass %): 200 pts.

The following violet dye powder is added the intermediate blue paste and stirred well so as to produce the blue paste 2.
violet dye 2.6 pts.

<Preparing Blue Resist BR2>

The blue resist BR2 is prepared by using the blue paste 2 instead of the blue paste 1 and the same method as that of the blue resist BR1.

<Relationship Between Relative Dielectric Constant of Various Resists and Measurement Frequency>

Table 1 shows an example of relationship between relative dielectric constants of red resists RR1 and RR2, green resists GR1 and GR2, blue resists BR1 and BR2 and the measurement frequencies.

TABLE 1

| Composition | | Red resist RR1 | Green resist GR1 | Blue resist BR1 | Red resist RR2 | Green resist GR2 | Blue resist BR2 |
| --- | --- | --- | --- | --- | --- | --- | --- |
| Relative | 120 Hz | 3.6 | 3.7 | 3.8 | 3.2 | 3.5 | 3.1 |
| Dielectric | 240 Hz | 3.6 | 3.7 | 3.8 | 3.2 | 3.4 | 3.0 |
| Constant | 480 Hz | 3.5 | 3.7 | 3.7 | 3.2 | 3.4 | 3.0 |

(Numeric values of 120 Hz, 240 Hz, 480 Hz represent measurement frequency)

<Preparing Color Filter Substrate 4>

First, the transparent electrode layer 12a and 12b are formed on both surfaces of the transparent substrate 11 prior to the coloring step of a color filter CF.

A composite metal oxide which is transparent, having conductivity such as ITO is used for the transparent electrode layers 12a and 12b. The transparent electrode layers 12a and 12b are formed, by a sputtering apparatus, on both surfaces of the transparent substrate 11 or formed on every single surface with for two manufacturing steps. The transparent electrode layers 12a and 12b are pattern-formed using a photolithography.

When forming the transparent electrode layers 12a and 12b, the transparent electrode layer 12b can be formed first, and then the transparent electrode layer 12a can be formed. Specifically, for forming the transparent electrode layers 12a and 12b, for example, film forming of ITO of the transparent electrode layer 12b is executed on the first surface of the transparent substrate 11. Subsequently, photolithography of the transparent electrode layer 12b (including etching and resist stripping steps) is executed. After the forming step of the transparent electrode layer 12b, subsequently, ITO film forming of the transparent electrode layer 12a is performed on the second surface of the transparent substrate 11 and then, a photolithography of the transparent electrode layer 12a (including etching and resist stripping steps) is executed. At least one pattern in the transparent electrode layers 12a and 12b includes alignment marks used for following manufacturing steps.

Hereinafter will be described manufacturing steps of the color filter CF provided with a light shielding layer 18 on the frame region 17, such as color filters 4 and 19 according to the above-described first and second embodiments. In the color filter substrate 25 according to the third embodiment, in which the light shielding layer 18 is not provided on the frame region 17, alignment marks of the first color (e.g., red) are generated to be aligned with alignment marks corresponding to at least either the transparent electrode layers 12a or 12b.

In the subsequent manufacturing steps, a case is described where photolithography processing is performed on an upper surface on which the transparent electrode layer 12a is to be formed as an upper surface.

After forming the transparent electrode layers 12a and 12b, a black resist 1 containing carbon pigment as a principal component is coated on a surface on which the transparent electrode layer 12a is formed and dried. By using a photomask including a pattern of the frame region 17 and a pattern of the alignment marks, exposure, development, heating and curing are performed so as to produce the light shielding layer 18 of the frame region 17 and alignment marks. Regarding the alignment of a pattern of the frame region 17, a camera captures a back surface on which the black resist 1 is coated (a direction towards a surface on which the transparent electrode layer 12b is formed), the alignment is executed based on an image captured by the camera.

Hereinafter will be described the light shielding layer 18 and the alignment marks in more detail. The black resist 1 is coated on whole surface of the transparent electrode layer 12a such that the film thickness after drying becomes 2.5 μm. Next, the substrate to be processed is pre-baked in a clean oven for 20 minutes at 70 degrees C. and cooled at the room temperature. Subsequently, as a pre-process before exposing to ultra violet, an alignment is performed. In the alignment, halogen lamp is used as a light source. The light emitted from the halogen lamp is irradiated only to a vicinity of the alignment marks of the transparent electrode layer 12a from a surface in which the transparent electrode layer 12b is formed to be captured by a camera. The alignment is executed by a result of the capture by the camera. For irradiation to the vicinity of the alignment marks, light in which the wavelength of light for exposure is cut off by a cutoff filter is used.

Subsequently, based on the alignment result, by using extra-high pressure mercury lamp, a coated surface of the black resist 1 is exposed to ultraviolet light. The photomask used for the exposure includes a pattern of the frame region 17 and a pattern of a plurality of cross-shaped alignment marks. The pattern of the frame region 17 and the pattern of the plurality of cross-shaped alignment marks are exposed to ultraviolet light by using this photo mask. The pattern in the frame region and the pattern of a plurality of cross-shaped alignment marks are developed. Then, the substrate to be processed is sprayed with sodium carbonate solution at 23 degrees C., cleaned by deionized water and then dried. After the drying, the substrate to be processed is cured at 230 degrees C. for 20 minutes, whereby the frame region 17, the light shielding layer 18 and alignment marks are formed.

Next, the above-described three colors of resist are used subsequently to form the red filter RF, the green filter GF and the blue filter BF by the photolithography method.

For forming the red filter RF, the green filter GF and the blue filter BF, for example to produce the film thickness 2.5 μm, first, the red resist RR is coated to the substrate to be processed, dried, exposed by an exposure machine and developed, whereby a stripe-shaped red filter RF is formed.

Next, the green resist GR, for example to produce the film thickness 2.5 μm, is coated to the substrate to be processed, dried, exposed by an exposure machine and developed, whereby a stripe-shaped green filter GF is formed.

Next, the blue resist BR, for example to produce the film thickness 2.5 μm, is coated to the substrate to be processed, dried, exposed by an exposure machine and developed, whereby a stripe-shaped blue filter BF is formed.

Then, after forming the red filter RF, the green filter GF and the blue filter BF, the transparent resin layer 14 is formed to have film thickness 2 μm, thereby producing the color filter substrate 4.

The above-described respective embodiments can be modified in various ways without departing the spirit of the invention and can be adapted thereto. The above-described respective embodiments can be employed by combining them freely.

The present invention has an object to provide a liquid crystal display device having a high precision touch sensing function, and a color filter used for the same.

As a first aspect, a liquid crystal display device is provided with a touch panel function, in which an array substrate and a color filter substrate are faced each other via a liquid crystal layer. The color filter substrate includes: a transparent substrate; a first transparent electrode layer; a second transparent electrode layer; a color filter; and a transparent resin layer. The first transparent electrode layer is formed on a first surface of the transparent substrate for touch sensing. The second transparent electrode layer is formed on a second surface of the transparent substrate for the touch sensing. The color filter is formed on the first transparent electrode layer, including a red filter, a green filter and a blue filter. The transparent resin layer is formed on the color filter.

In the liquid crystal display device, the second transparent electrode layer is formed on a display surface side and the transparent resin layer is formed on a liquid crystal layer side. The total film thickness of the color filter and the transparent resin layer is within a range approximately from 2.5 μm to 9 μm. The liquid crystal layer includes liquid crystal molecules having negative dielectric anisotropy and an initial state alignment which is parallel to a substrate surface. The liquid crystal molecules rotate parallel with respect to the substrate surface when a liquid crystal drive voltage is applied.

The total film thickness of the color filter and the transparent resin layer may be within a range approximately from 2.5 μm to 4.5 μm.

A pattern of the first transparent electrode layer and a pattern of the second transparent electrode layer may be orthogonally crossed with each other in a plan view.

A pattern of the first transparent electrode layer and a pattern of the second transparent electrode layer may be alternately arranged to have substantially no gaps therebetween in a plan view.

As a second aspect, the color filter substrate faces an array substrate via a liquid crystal layer. The color filter substrate includes: a transparent substrate; a first transparent electrode layer; a second transparent electrode layer; a color filter; and a transparent resin layer. The transparent electrode layer is formed on a first surface of the transparent substrate for touch sensing. The second transparent electrode layer is formed on a second surface of the transparent substrate for touch sensing. The color filter is formed on the first transparent electrode layer, including a red filter, a green filter and a blue filter. The transparent resin layer is formed on the color filter.

In the color filter substrate, the second transparent electrode layer is formed on a display surface side and the transparent resin layer is formed on a liquid crystal layer side. A total film thickness of the color filter and the transparent resin layer is within a range approximately from 2.5 μm to 9 μm. Each of the red filter, the green filter and the blue filter has a relative dielectric constant ranging from 2.9 to 4.4 when being measured at a frequency used for driving a liquid crystal. Each of the relative dielectric constant of the red filter, the green filter and the blue filter is within a range ±0.3 with respect to an average relative dielectric constant of the red filter, the green filter and the blue filter.

In the color filter substrate, a light shielding layer containing an organic pigment as a principal component of a visible range light shielding color material may be respectively formed on a part of red filter, a part of green filter and a part of blue filter in an effective display region.

The red filter, the green filter and the blue filter may be line-shaped patterns each being adjacent to a different color with no gaps therebetween. A first color filter among a red filter, a green filter and a blue filter may be arranged to separate a second color filter and a third color filter among the red filter, a green filter and a blue filter. A line width of the first color filter may be approximately ½ size of a line width of the second and the third color filters.

The color filter substrate may be provided with a red filter, a green filter and a blue filter in an effective display region and a light shielding layer on a frame region that surrounds the effective display region. A total film thickness of each of the red filter, the green filter and the blue filter, and the transparent resin layer in the effective display region may be approximately the same as a total film thickness of the light shielding layer and the transparent resin layer in the effective display region.

The color filter substrate may be provided with a red filter, a green filter and a blue filter in an effective display region. Also, color filter substrate may be provided with a first light shielding layer containing a carbon pigment as a principal component of a visible range light shielding color material, and a second light shielding layer containing an organic pigment as a principal component of a visible range light shielding color material in a frame region that surrounds the effective display region.

In the color filter substrate, a light shielding layer containing a carbon pigment as a principal component of a visible range light shielding color material and having a lattice-shape or a striped-shape may be formed on the first transparent electrode layer in an effective display region. The color filter is formed on the first transparent electrode layer on which the light shielding layer may be formed. A total film thickness of the light shielding layer, the color filter and the transparent resin layer may be within a range approximately from 2.5 μm to 9 μm.

According to aspects of the present invention, a liquid crystal display device having high precision touch sensing function and a color filter used for the same can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device having a touch panel function, comprising:
an array substrate;
a liquid crystal layer including a liquid crystal molecule; and
a color filter substrate positioned over the array substrate via the liquid crystal layer, the color filter substrate including a transparent substrate having a first surface and a second surface opposite with respect to the first surface, a first transparent electrode layer formed on the first surface of the transparent substrate, a second transparent electrode layer formed on the second surface of the transparent substrate on a display surface side, a color filter formed on the first transparent electrode layer and including a red filter, a green filter and a blue filter, and a transparent resin layer formed on the color filter on a side of the liquid crystal layer,
wherein the color filter and the transparent resin layer have a total thickness in a range of approximately from 2.5 μm to 9 μm, the liquid crystal layer is formed such that the liquid crystal molecule has negative dielectric anisotropy and an initial state alignment which is parallel to a substrate surface, and that the liquid crystal molecule rotates within a plane parallel to the substrate surface when a liquid crystal drive voltage is applied, and the color filter is formed such that the red filter includes a red pigment C.I. Pigment Red 254, the green filter includes a green pigment C.I. Pigment Green 58 and the blue filter includes a blue pigment C.I. Pigment Blue 15:6, that each of the red filter, the green filter and the blue filter has a relative dielectric constant ranging from 3.0 to 3.8 when measured at a frequency for driving the liquid crystal display device, and that each of the relative dielectric constants of the red filter, the green filter and the blue filter is within a range of ±0.3 with respect to an average relative dielectric constant of the red filter, the green filter and the blue filter, the red, green and blue filters have line-shaped patterns each being adjacent to a different color with no gaps therebetween, and one of the red, green and blue filters is formed between the other two of the red, green and blue filters and has a line width which is approximately ½ size of a line width of each of the other two.

2. The liquid crystal display device according to claim 1, wherein the color filter and the transparent resin layer have a total thickness in a range of approximately from 2.5 μm to 4.5 μm.

3. The liquid crystal display device according to claim 1, wherein a pattern of the first transparent electrode layer and a pattern of the second transparent electrode layer are orthogonally crossed with each other in a plan view.

4. The liquid crystal display device according to claim 1, wherein a pattern of the first transparent electrode layer and a pattern of the second transparent electrode layer are alternately arranged to have substantially no gaps therebetween in a plan view.

5. The liquid crystal display device according to claim 1, wherein the color filter substrate further comprises a light shielding layer formed on a portion of each of the red, green and blue filters in an effective display region, wherein the light shielding layer includes an organic pigment as a principal component of a visible range light shielding color material.

6. The liquid crystal display device according to claim 1, wherein the color filter substrate further comprises a light shielding layer formed on a frame region that surrounds an effective display region, wherein the color filter substrate includes the red, green and blue filters in the effective display region, and each of the red, green and blue filters and the transparent resin layer in the effective display region have a total thickness which is approximately the same as a total thickness of the light shielding layer and the transparent resin layer in the effective display region.

7. The liquid crystal display device according to claim 1, wherein the color filter substrate further comprises a first light shielding layer including a carbon pigment as a principal component of a visible range light shielding color material, and a second light shielding layer including an organic pigment as a principal component of a visible range light shielding color material, wherein the first and second light shielding layers are formed in a frame region that surrounds an effective display region, and the color filter substrate includes the red, green and blue filters in the effective display region.

8. The liquid crystal display device according to claim 1, wherein the color filter substrate further comprises a light shielding layer formed on the first transparent electrode layer in an effective display region, wherein the light shielding layer includes a carbon pigment as a principal component of a visible range light shielding color material and has a lattice-shape or a striped-shape, the color filter is formed on the first transparent electrode layer on which the light shielding layer is formed, and a total thickness of the light shielding layer, the color filter and the transparent resin layer is in a range of approximately from 2.5 μm to 9 μm.

9. A color filter substrate, comprising:
a transparent substrate having a first surface and a second surface opposite with respect to the first surface;
a first transparent electrode layer formed on the first surface of the transparent substrate;
a second transparent electrode layer formed on the second surface of the transparent substrate on a display surface side;
a color filter formed on the first transparent electrode layer and including a red filter, a green filter and a blue filter; and
a transparent resin layer formed on the color filter on a side of the liquid crystal layer,
wherein the color filter and the transparent resin layer have a total thickness in a range of approximately from 2.5 μm to 9 μm, each of the red, green and blue filters has a relative dielectric constant ranging from 3.0 to 3.8 when measured at a frequency for driving a liquid crystal display, the relative dielectric constant of each of the red filter, the green filter and the blue filter is within ±0.3 of an average relative dielectric constant of the red, green and blue filters, the color filter is formed such that the red filter includes a red pigment C.I. Pigment Red 254, the green filter includes a green pigment C.I. Pigment Green 58 and the blue filter includes a blue pigment C.I. Pigment Blue 15:6, the red, green and blue filters have line-shaped patterns each being adjacent to a different color with no gaps therebetween, and one of the red, green and blue filters is formed between the other two of the red, green and blue filters and has a line width which is approximately ½ size of a line width of each of the other two.

10. The color filter substrate according to claim 9, further comprising:
a light shielding layer formed on a portion of each of the red, green and blue filters in an effective display region, wherein the light shielding layer includes an organic pigment as a principal component of a visible range light shielding color material.

11. The color filter substrate according to claim 9, further comprising:
a light shielding layer formed on a frame region that surrounds an effective display region,
wherein the color filter substrate includes the red, green and blue filters in the effective display region, and each of the red, green and blue filters and the transparent resin layer in the effective display region have a total thickness which is approximately the same as a total thickness of the light shielding layer and the transparent resin layer in the effective display region.

12. The color filter substrate according to claim 9, further comprising:
a first light shielding layer including a carbon pigment as a principal component of a visible range light shielding color material; and
a second light shielding layer including an organic pigment as a principal component of a visible range light shielding color material,
wherein the first and second light shielding layers are formed in a frame region that surrounds an effective display region, and the color filter substrate includes the red, green and blue filters in the effective display region.

13. The color filter substrate according to claim 9, further comprising:
a light shielding layer formed on the first transparent electrode layer in an effective display region,
wherein the light shielding layer includes a carbon pigment as a principal component of a visible range light shielding color material and has a lattice-shape or a striped-shape, the color filter is formed on the first transparent electrode layer on which the light shielding layer is formed, and a total thickness of the light shielding layer, the color filter and the transparent resin layer is in a range of approximately from 2.5 μm to 9 μm.

14. The color filter substrate according to claim 9, further comprising:
a light shielding layer formed on a portion of each of the red, green and blue filters in an effective display region.

15. The color filter substrate according to claim 9, further comprising:
- a light shielding layer formed on a frame region that surrounds an effective display region,
- wherein the color filter substrate includes the red, green and blue filters in the effective display region.

16. The color filter substrate according to claim 9, further comprising:
- a first light shielding layer; and
- a second light shielding layer,
- wherein the first and second light shielding layers are formed in a frame region that surrounds an effective display region, and the color filter substrate includes the red, green and blue filters in the effective display region.

17. The color filter substrate according to claim 9, further comprising:
- a light shielding layer formed on the first transparent electrode layer in an effective display region,
- wherein the light shielding layer has a lattice-shape or a striped-shape, and the color filter is formed on the first transparent electrode layer on which the light shielding layer is formed.

18. The color filter substrate according to claim 9, further comprising:
- a light shielding layer formed on the first transparent electrode layer in an effective display region,
- wherein the color filter is formed on the first transparent electrode layer on which the light shielding layer is formed, and a total thickness of the light shielding layer, the color filter and the transparent resin layer is in a range of approximately from 2.5 μm to 9 μm.

19. The color filter substrate according to claim 9, further comprising:
- a light shielding layer formed on the first transparent electrode layer in an effective display region,
- wherein a total thickness of the light shielding layer, the color filter and the transparent resin layer is in a range of approximately from 2.5 μm to 9 μm.

20. The color filter substrate according to claim 9, further comprising:
- a light shielding layer formed on the first transparent electrode layer in an effective display region,
- wherein the color filter is formed on the first transparent electrode layer on which the light shielding layer is formed.

* * * * *